US006493009B1

(12) United States Patent
Mukai et al.

(10) Patent No.: US 6,493,009 B1
(45) Date of Patent: Dec. 10, 2002

(54) IMAGE FORMING APPARATUS

(75) Inventors: Hirokazu Mukai, Nakai-machi (JP); Mamoru Kido, Nakai-machi (JP); Nobuyuki Nakayama, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/184,069

(22) Filed: Nov. 2, 1998

(30) Foreign Application Priority Data

Nov. 11, 1997 (JP) ........................................ 9-308678

(51) Int. Cl.[7] ........................ G01D 15/16; B41J 2/01; B41J 2/385

(52) U.S. Cl. .................... 346/140.1; 347/103; 347/158

(58) Field of Search ...................... 346/140.1; 347/103, 347/224, 225, 262, 264, 55, 213, 212, 158; 101/465, 467

(56) References Cited

U.S. PATENT DOCUMENTS

| | | | | | |
|---|---|---|---|---|---|
| 4,387,382 | A | * | 6/1983 | Kohashi | 347/55 |
| 4,470,055 | A | * | 9/1984 | Todoh | 346/140.1 |
| 4,527,171 | A | * | 7/1985 | Takanashi et al. | 347/212 |
| 4,729,310 | A | * | 3/1988 | Love, III | 101/157 |
| 4,739,348 | A | * | 4/1988 | Ando et al. | 347/55 |
| 4,855,768 | A | * | 8/1989 | Iino et al. | 347/55 |
| 5,176,974 | A | * | 1/1993 | Till et al. | 430/42 |
| 5,335,001 | A | * | 8/1994 | Katano | 347/183 |
| 6,043,830 | A | * | 3/2000 | Zur et al. | 347/120 |

FOREIGN PATENT DOCUMENTS

| | | | |
|---|---|---|---|
| JP | 62-92849 A * | 4/1987 | B41J/3/04 |
| JP | A-3-240072 | 10/1991 | |
| JP | A-4-83658 | 3/1992 | |

OTHER PUBLICATIONS

Hiroshi Imada et al. "Numerical Analysis of Potential Distribution in the Development zone of a Copying Machine and its effect on the contrast potential", Society of Electrophotography of Japan, 104$^{th}$ issue, vol. 32, No. 3, (1993), Imada et al., pp. 253–258.

Gruber, R.J. et al. Technology Assessment of Oce 3125C Copier (1996), 44 pages.

Jerome Johnson, "TonerJet® Color Printer", IS&T's NIP 12: International Conference on Digital Printing Technologies, pp. 267–269.

* cited by examiner

*Primary Examiner*—Hai Pham
(74) *Attorney, Agent, or Firm*—Oliff & Berridge, PLC

(57) ABSTRACT

An image forming apparatus, applicable to copying machines, facsimile apparatuses and printers, controls pixel positions with high precision. An image of color material is formed on the surface of an image holding drum. The surface of the image holding drum divides into a number of pixel areas, and each pixel area has an adhesive-force change portion smaller than the pixel area, where adhesive force to color material changes by a predetermined stimulus. An image-signal input unit forms an image by distribution of adhesive force to the color material on the surface of the image holding drum by inputting a stimulus corresponding to an image signal into the image holding drum. A color material supply unit supplies color material particles to the surface of the image holding drum. A transfer unit transfers an image of the color material particles formed on the surface of the image holding drum, directly or via a predetermined intermediate transfer medium, onto an image print sheet on which the image is finally printed.

20 Claims, 36 Drawing Sheets

CONVENTIONAL ART

PRESENT EMBODIMENT

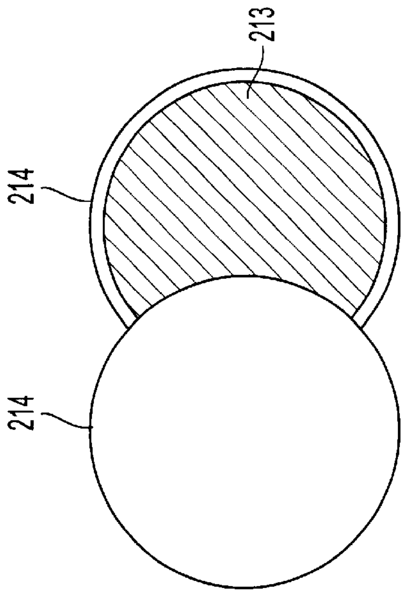
FIG. 15
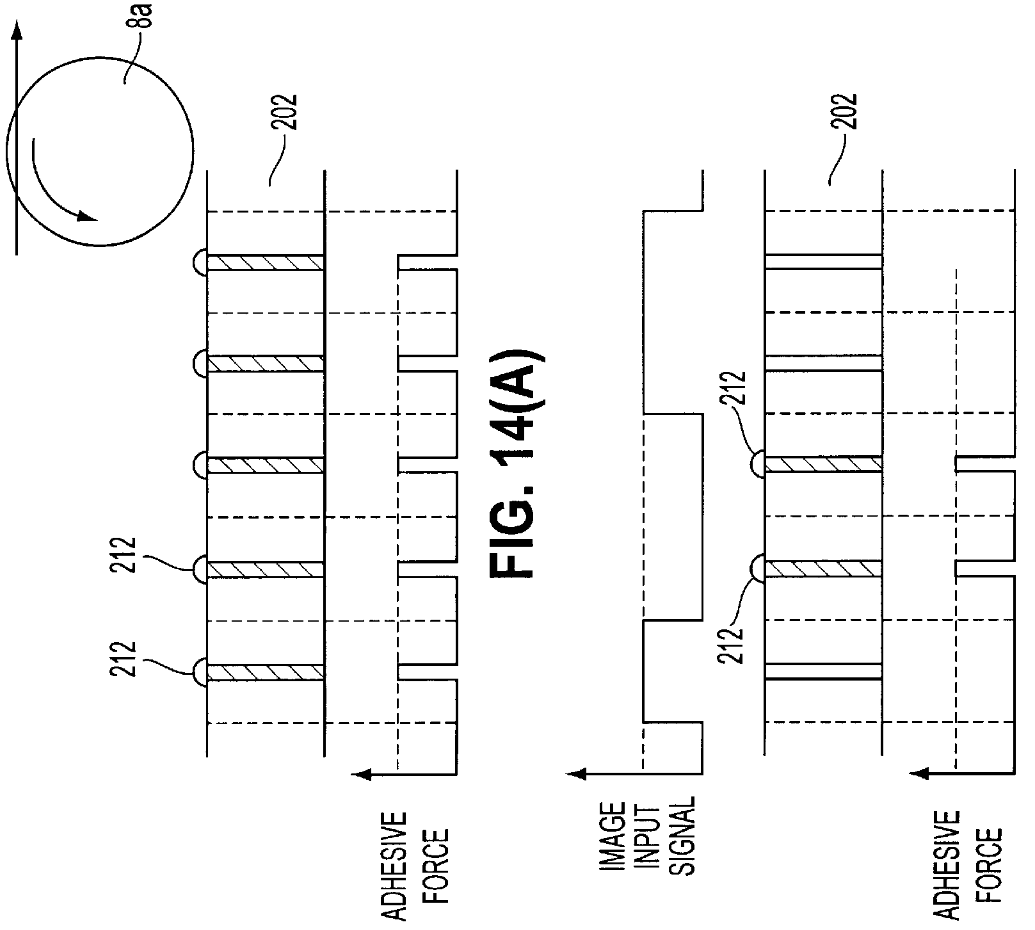
FIG. 14(A)
FIG. 14(B)

IMAGE FORMING APPARATUS

BACKGROUND OF THE INVENTION

1. Field of the Invention

The present invention relates to an image forming apparatus applicable to copying machines, facsimile apparatuses, printers and the like.

2. Description of the Related Art

In the conventional electrophotographic image formation process, pixel position shift occurs due to some factors. In a microscopic view, the pixel position shift is positional shift of one toner particle, i.e., scatter of toner, movement faithfully corresponding to electric field of a latent image, or transfer failure; in a macroscopic view, the pixel position shift is a systematic failure as color shift in a copying machine and a printing apparatus.

First, a description will be made on a problem in transfer of toner onto a printing medium by an electric charge q held by the toner and an electrostatic force F=q·E applied among a photoreceptor body, developing electrodes, a sheet, and an intermediate transfer body.

FIG. 34A shows a spatial electric field caused between a well-regulated rectangular latent image on the photoreceptor body and developing electrodes (The 104th issue of the society of Electrophotography of Japan, Vol. 32 No. 3., 1993). An equipotential line is not completely parallel to the surfaces of the photoreceptor, the developing electrodes and the like, since the photoreceptor body and the developing electrodes are not complete parallel electrodes and an electric force line deflects due to edge effect of edge portions of the rectangular latent image. FIG. 34 shows a profile of contrast potential in case of shift from the center of the latent image in a process direction (photoreceptor-body rotation direction) X and in an object electrode direction (gap) Y. Note that latent images having a uniform charge density of 100 μm in length in the process direction are provided at 100 μm intervals on the photoreceptor body.

FIG. 35 shows the distribution of contrast potential upon scanning in the direction Y. In FIG. 35, a solid line a denotes a position at the center of the central latent image; a dotted line b, an intermediate position between the central latent image and its adjacent latent image; and an alternate long and short dashed line c, the result of scanning at a point 70 μm away from the outer end of the outermost latent image. These calculation results show that the maximum point of the contrast potential lowers as it becomes away from the center of the latent image in the process direction, and the point is becoming shifted between the photoreceptor body and the object electrode. In an actual developing process, development is not started at the latent image center (X=0), but at a point where the potential reaches an effective electric-field threshold value (an effective electric-field threshold value determined by the electric field of the photoreceptor body, the electric charge of toner, and the bias of developing electrode) within a developing nip. Accordingly, the result of development is similar to development shifted in the direction X as shown in FIG. 35.

The toner receives an electrostatic force for transfer and movement, however, as the contrast potential is low and the development is made at the shifted position, the toner cannot be brought to the original pixel position. This is an inherent problem of electrophotographic technique based on the electrostatic dynamics.

On the other hand, in the macroscopic view, the above technique has problems of color shift and color registration.

In a low frequency band, color shift occurs, while in a high frequency band, regular stripes (hereinafter referred to as "banding") occurs in a process direction, greatly depending on the rotation or moving precision (hereinafter referred to as "motion quality") of a photoreceptor body, a transfer drum and a sheet conveyance belt generally used in copying machines and printers. The color shift and banding due to bad motion quality appear in a highly precise halftone representation or color characteristic representation as a defect of the image, which greatly degrades the image quality. For this reason, in the conventional copying machines and printers, feedback or feedforward control is performed, or the mechanical precision of constituent parts and assembling is improved so to attain high motion quality in the photoreceptor body and the conveyance belt. Further, various problems of time variation, environmental change, especially change in light quantity of recording-information writing unit due to temperature change, and shift of synchronism among the respective mechanical structures (e.g., in a tandem type copying machine or printer, the ratio between the diameter of a roller for conveying a conveyance belt and the distance between the roller and a photoreceptor body is set to be an integer, however, it changes due to the apparatus frame and temperature expansion of the roller), must be solved. The above problems cause enlargement in apparatus size, complication and a high cost, and poses a limitation on the conventional electrophotographic technique as a printing technique so as not to lower reliability.

However, in the field of printing technique, by solving the problem of pixel position shift, high precision is attained at a cost of high apparatus price. Basically, as a plate is used, pixel position shift in an image writing process as in the electrophotographic printing does not occur. Further, color printing of yellow, magenta, cyan and black is performed in a stable manner from a plate, then a blanket, to a print sheet, by using a physical phenomenon "thixotropy" characteristic of printing ink. Further, the plate, the blanket, a sheet support and conveyance member, having high reliability and durability, are driven by high-precision helical gears and the like. Further, the pixel position shift in high quality printing is 15 to 30 μm on an average by performing pixel-position shift regulation by an expert operator. However, as the enlargement of apparatus size and high price cannot be avoided, this printing technique is not sufficiently applicable to on-demand printing as a printing technique for business use or office use.

A printing technique Oce3125C, reported in CeBIT '96, is known. This technique visualizes toner by bias development without an electrostatic latent image on a photoreceptor body. FIG. 36 shows a cross section of an imaging drum. Ring electrodes 70 are provided in 400 dpi in an insulating layer 71 in its axial direction. The surface of the imaging drum is covered with a dielectric layer 69.

FIG. 37 shows the construction of the entire apparatus. Alphabets "K", "B", "R", "G", "M", "C" and "Y" added to respective reference numerals denote respective colors. When a part is representatively used in the description, such alphabet will be omitted. Each imaging drum 72 has a matrix-arranged fixed electrodes for transmitting printing information from a slip ring (not shown). Toner moves from a developing roller 74, to which an electric field is applied in accordance with the printing information, to the imaging drum 72 and forms an image. The imaging drums 72, i.e., black imaging drum 72B to yellow imaging drum 72Y, are tandem-arranged around a transfer drum 73, and developing rollers 74, i.e., black developing roller 74B to yellow developing roller 74Y, are arranged at the respective imaging drums. A printing process starts with development. The respective seven color toner images are sequentially formed, each in single layer, on the imaging drums 72. Next, the respective color toner is transferred onto the intermediate transfer drum 73 without overlapping the respective color toner, and a print sheet is conveyed from a paper cassette 58, timed with the front end of the image on the intermediate transfer drum 73. The image on the intermediate transfer drum 73 is transferred by a secondary transfer roller 75 onto the print sheet, and the print sheet is discharged onto a discharge tray 62.

However, in this technique, pixel position is not controlled on toner within a 63.5 μm (400 dpi) pixel area. Further, in the printing process, color image formation is made by respective single layer toner, i.e., in a parallel color image structure, positional shift between pixels (color registration) seriously influences degradation of image quality especially in a color space representation area (color gamut).

Further, as another printing technique, toner-jet printing represented by Array Printers AB is known. This technique forms a color image by directly discharging nonmagnetic single-component color toner (black is magnetic single-component toner) on a developing sleeve onto a print sheet. Two-dimensionally-arranged mesh control electrodes are provided between the developing sleeve and the print sheet, and a uniform rear-surface electrode is provided facing the rear surface of the print sheet. The toner is discharged in accordance with print information onto the print sheet by a voltage of 1500 V and a control electrode voltage (275 V in printing and −50 V not in printing) applied between the developing sleeve and the rear-surface electrode. This printing technique has a problem that the hole diameter of the mesh control electrode is about 100 to 150 μm. As toner is discharged in lump, rebound occurs on the print sheet, which results in high background image (the base of the print sheet is stained). This is a weak point of the printing process itself to discharge toner in lump, as well as the rebound phenomenon, and this is the greatest cause of degradation of graininess. The printing technique also has a problem of toner clogging or attachment to the control electrodes. Accordingly, a cleaning unit for the control electrodes is required, which increases the size and price of the apparatus. Japanese Published Unexamined Patent Application No. Hei 4-83658 discloses a technique to apply an alternating voltage to the rear surface of an aperture electrode so as to prevent contamination of the rear surface. In any case, in printing technique to insert a control electrode between a developing sleeve with extremely small gaps about 200 μm and rear-surface electrodes and pass toner through the holes of the control electrodes, the problem of contamination of electrode must be solved.

In printing techniques for color image formation, if particles for image formation are transferred to a position shifted from a desired pixel position on a print medium, such pixel position shift causes degradation of image quality including deterioration of graininess due to scatter or drop of particles and the like, reduction of color-space representation region (color gamut), occurrence of color registration and bonding.

SUMMARY OF THE INVENTION

The present invention has been made in consideration of the above situation, and has an object to provide an image printing apparatus which prevents the above degradation of image quality by pixel position control with high precision.

According to one aspect of the present invention, the foregoing object is attained by providing an image forming apparatus comprising: an image holder that forms an image of color material on an image holder surface, the image holder surface dividing into a number of pixel areas each having an adhesive-force change portion smaller than the pixel area where adhesive force to color material changes by a predetermined stimulus; an image-signal input unit that forms an image by distribution of adhesive force to the color material on the image holder surface by inputting a stimulus corresponding to an image signal into the image holder; a color material supply unit that supplies the color material to the image holder surface; and a transfer unit that transfers the image of the color material formed on the image holder surface, directly or via a predetermined intermediate transfer medium, onto an image print sheet on which the image is finally printed.

Further, according to another aspect of the present invention, the foregoing object is attained by providing an image forming apparatus comprising: an image holder that forms an image of color material on an image holder surface, the image holder surface dividing into a number of pixel areas each having an adhesive-substance reception portion, smaller than the pixel area, having adhesive force to color material, to receive substance which disappears by a predetermined stimulus; an adhesive-substance supply unit that supplies substance having adhesive force to color material to the image holder surface such that the adhesive-substance reception portion holds the substance; an image-signal input unit that forms an image by distribution of adhesive force to the color material on the image holder surface by inputting a stimulus corresponding to an image signal into the image holder; a color material supply unit that supplies the color material to the image holder surface; and a transfer unit that transfers the image of the color material formed on the image holder surface, directly or via a predetermined intermediate transfer medium, onto an image print sheet on which the image is finally printed.

Further, according to another aspect of the present invention, the foregoing object is attained by providing an image forming apparatus comprising: an image holder that forms an image of color material on an image holder surface, the image holder surface dividing into a number of pixel areas, each having an adhesive-substance holding portion holding color material supplied to the image holder surface, positioned in each of the pixel areas, and causing change in adhesive force to held color material in accordance with a predetermined stimulus; a color material supply unit that supplies color material to the image holder surface such that the color material holding portion holds the color material; an image-signal input unit that forms an image by distribution of adhesive force to the color material on the image holder surface by inputting a stimulus corresponding to an image signal into the image holder; a color material removing unit that forms an image by distribution of the color material on the image holder surface by removing excessive color material of the color material held on the image holder surface; and a transfer unit that transfers the image of the color material formed on the image holder surface, directly or via a predetermined intermediate transfer medium, onto an image print sheet on which the image is finally printed.

Other features and advantages of the present invention will be apparent from the following description taken in conjunction with the accompanying drawings, in which reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 14A and 14B are explanatory diagrams showing the image formation process in the third embodiment in FIG. 13;

FIG. 15 is a schematic diagram showing the structure of a capsule particle containing liquid;

DETAILED DESCRIPTION OF THE PREFERRED EMBODIMENTS

Preferred embodiments of the present invention will now be described in accordance with the accompanying drawings.

[First Embodiment]

Figure 1:
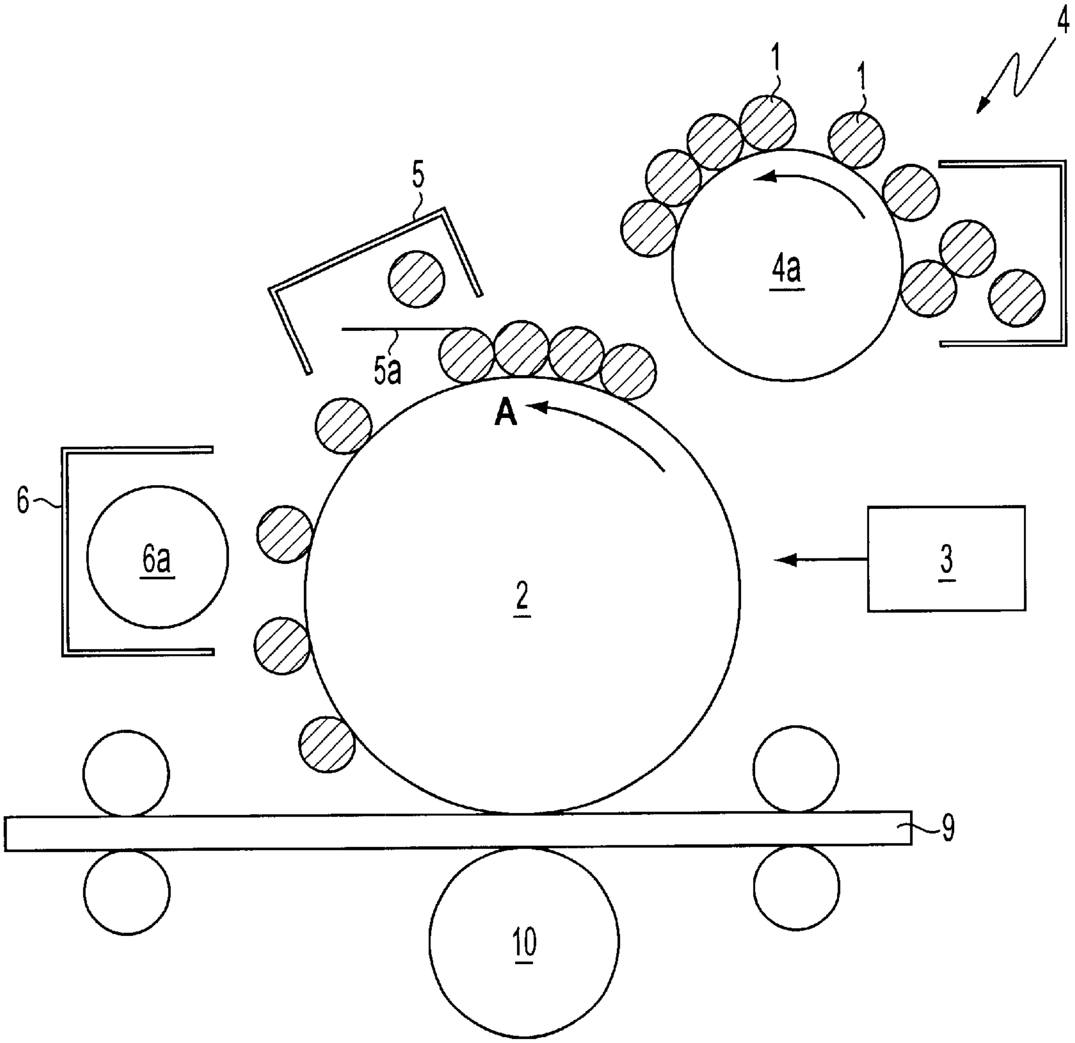
FIG. 1 is a cross sectional view showing an image forming apparatus according to a first embodiment of the present invention.

FIG. 1 is a cross sectional view showing the structure of an image forming apparatus according to a first embodiment of the present invention.

The image forming apparatus in FIG. 1 has an image holding drum 2 which rotates in an arrow A direction. An image is formed with color material particles 1 on the surface of the image holding drum 2.

Figure 2:
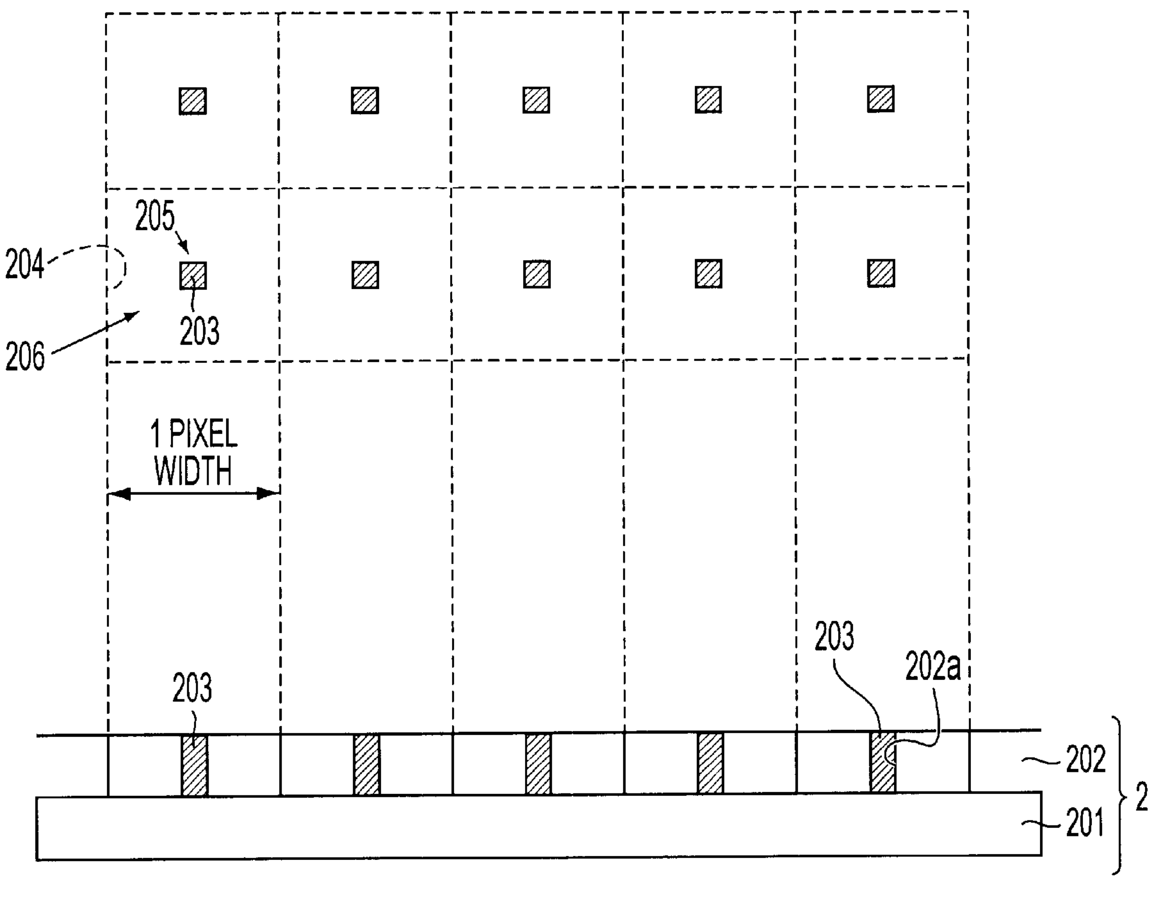
FIG. 2 is a cross sectional view with a projected plan view showing the structure of an image holding drum in the first embodiment in FIG. 1.

FIG. 2 is a cross sectional view showing the structure of the image holding drum 2 with a projected schematic plan view showing the surface of the image holding drum 2. The image holding drum 2 has a multilayer lattice structure comprising a base layer 201 and a porous layer 202 having holes 202*a* provided at a fixed pitch. The image holding drum 2 has a multilayer structure, however, it may have a monolayer structure as long as it has a porous portion. The pitch of the arrangement of the holes 202*a* of the porous layer 202 is 40 μm in case of 600 dpi image resolution. Further, the hole diameter is 13 μm smaller than a pixel width of 40 μm. That is, the holes are regularly and discretely, and two-dimensionally arranged on the surface of the image holding drum 2. A unit pixel area 204 comprises an adhesive-force generating portion 205 where the adhesive force of color material particles changes by inputting an image signal, and a pixel portion 206 other than the adhesive-force generating portion.

In the present embodiment, hot-melt adhesive 203 as adhesive-force generating material has a characteristic that the viscosity abruptly decreases and the adhesive force abruptly increases by heat melting. The softening point of the hot-melt adhesive 203 is 160° C. All the holes on the image holding drum 2 are filled with the hot-melt adhesive 203 for adhesion selection of color material particles. To fill the adhesive, e.g., molten hot-melt adhesive is uniformly applied to the entire drum surface and the hot-melt adhesive is cooled and solidified. As the hot-melt adhesive has fragility which increases in solidification, if a blade like tool is used to scrub the surface of the image holding drum, the hot-melt adhesive other than that filled in the holes can be easily removed.

The image forming apparatus in FIG. 1 has an image-signal input unit 3. The image-signal input unit 3 is a light irradiation unit based on an image signal, such as an LED unit or a semiconductor laser for, e.g., 600 dpi. The outputted light stimulus is emitted on the hot-melt adhesive 203 filled in the holes based on an image signal. If high-efficient light absorption substance such as phthalocyanine is uniformly dispersed in the hot-melt adhesive 203, the substance causes light absorption and heat energy generation, to melt-change the hot-melt adhesive 203.

Next, a phenomenon where shift Δx occurred due to insufficient synchronization between the rotation of the image holding drum 2 and the light irradiation by the image-signal input unit 3, will be described in detail.

Figure 3A:
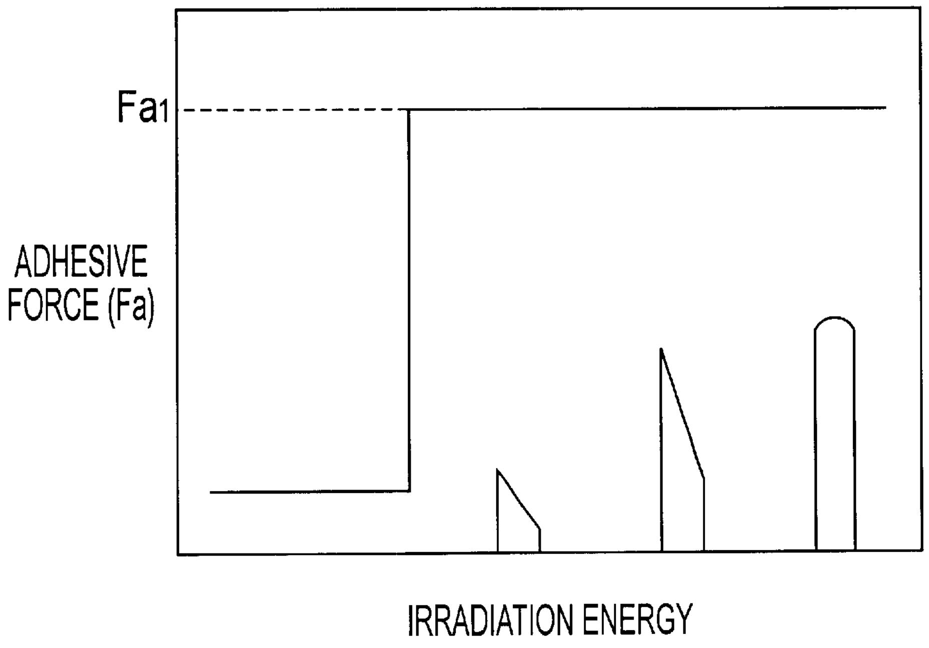
FIGS. 3A and 3B are graphs showing positional shift of input signal with respect to a unit pixel area.
Figure 3B:
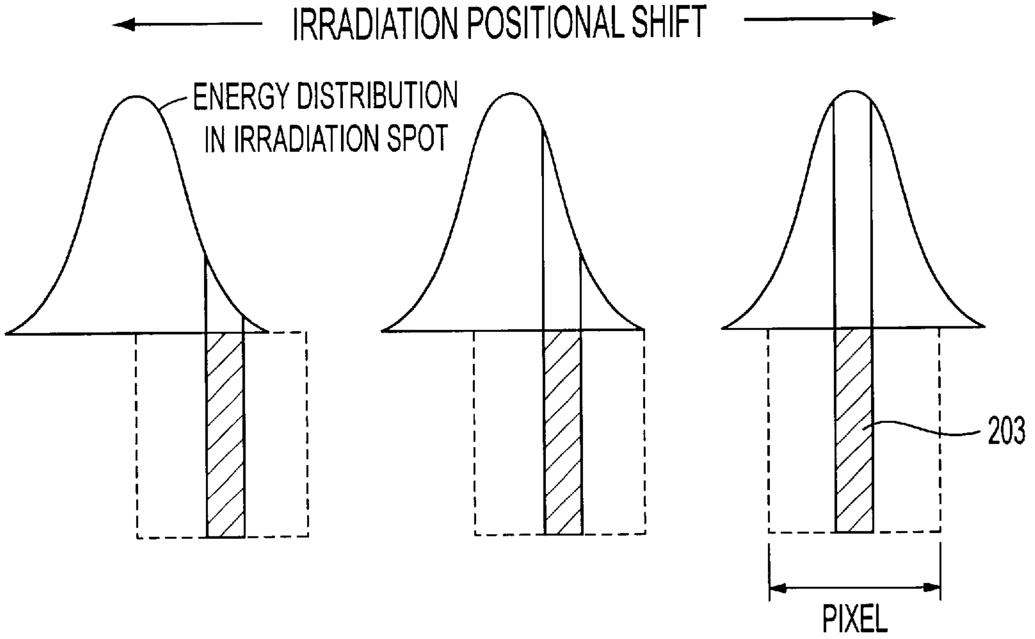
Figure 4:
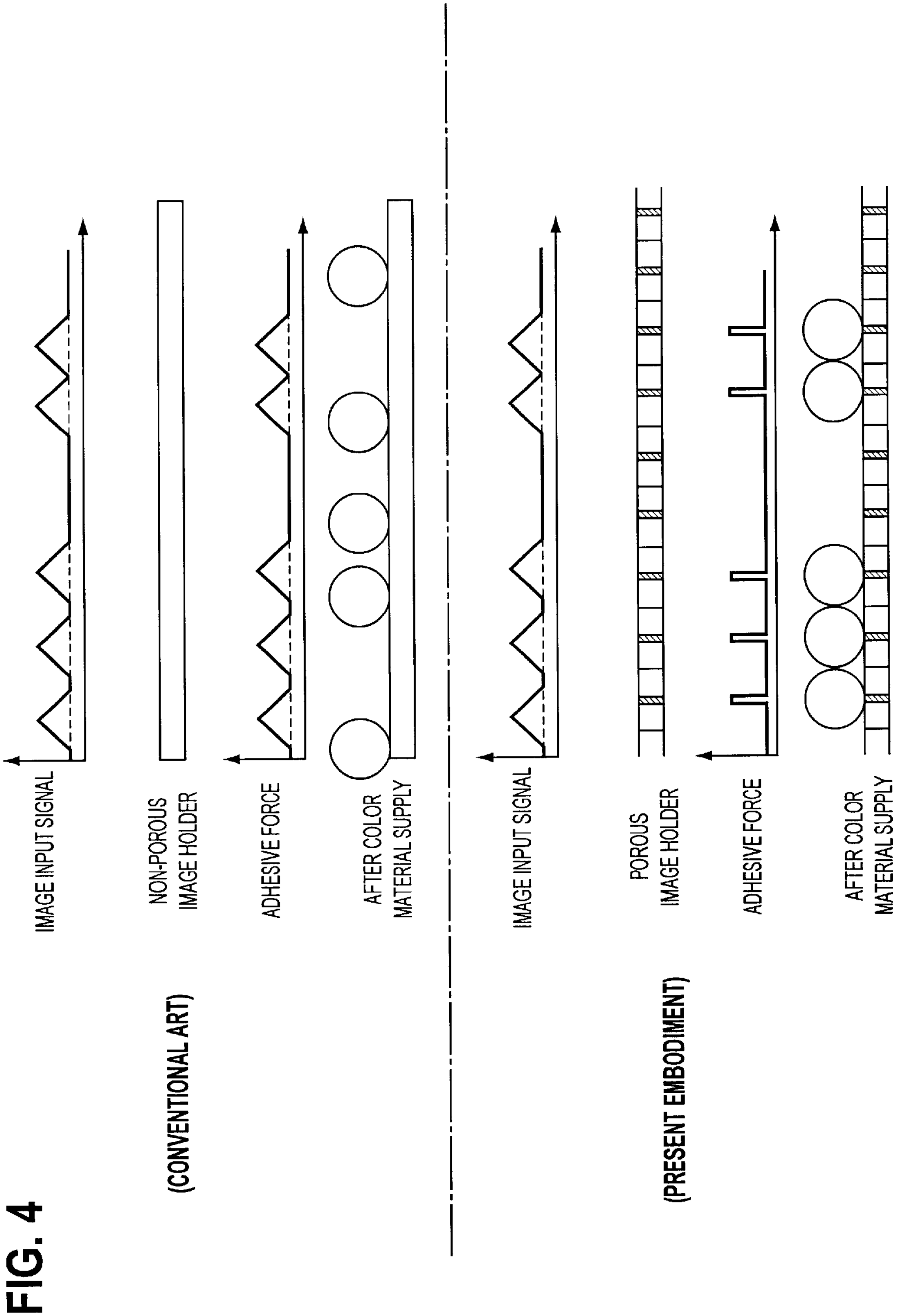
FIG. 4 is an explanatory diagram showing the difference in adhesive force distribution and a formable image between the first embodiment in FIG. 1 and a conventional method.

FIGS. 3A and 3B show the relation between the irradiation energy to the hot-melt adhesive and the adhesive force of the hot-melt adhesive (FIG. 3A) and the irradiation positional shift (FIG. 3B). When the irradiation energy to the hot-melt adhesive 203 is at a certain threshold value or higher, the adhesive force of the hot-melt adhesive 203 abruptly increases since the viscosity of the hot-melt adhesive 203 abruptly changes at a certain temperature, and the adhesive force greatly depends on the viscosity. That is, in the hot-melt adhesive 203 in an object pixel, the adhesive force can be abruptly changed as long as the adhesive is irradiated with light having a predetermined or greater spot area. FIG. 4 shows the difference in shift of image-signal input position between a conventional method and the present invention. This figure shows image signals, cross sectional structures around the surface of the image holding drum, adhesion of the surface of the image holding drum after image-signal input, image statuses after color material supply, and a relative positional relation between the conventional method and the present invention.

In the conventional method, the image holding drum 2 is nonstructural and has an adhesive-force generating portion on the entire surface. If an image signal is shifted from its original input position, the caused adhesive force is positionally shifted. On the other hand, in the present embodiment, as the adhesive-force generating portions are regularly and discretely arranged, the adhesive force is not positionally shifted but the adhesive force occurs around pixel central axes.

Returning to FIG. 1, before the hot-melt adhesive which has received an input light stimulus changes from the molten state to the solidified state, the color material particles 1 are supplied by using a color material supply unit 4. The color material supply unit 4 supplies color material to the image holding drum 2 by rubbing a rotate-driven color material supply roller 4*a* against the image holding drum 2. As the hot-melt adhesive 203 in an image portion is heat-melted and has increased adhesive force by the above-described process, the color material particles 1 are easily attached to the adhesive. By the adhesion of the color material particles 1, the heat is conducted from the hot-melt adhesive 203 to the color material particles 1, and the temperature of the hot-melt adhesive decreases. At this time, the viscosity and cohesive force of the hot-melt adhesive increase, and as a result, the adhesive more firmly holds the color material particles 1. Assuming that the color material particles 1 have spherical shape with a particle diameter equal to the pixel width, 40 μm, the color material particles 1 are attached to the hot-melt adhesive 203 nearly in a point contact state. As a result, the color material particles 1 are positioned on the pixel central axes, absorbing the asynchronism between the rotation of the image holding drum 2 and light irradiation by the light irradiating unit as the image-signal input unit 3. As shown in FIG. 4, the positional shift of image-signal input position, which has not been absorbed by the conventional method, can be absorbed in the present embodiment.

Figure 5:
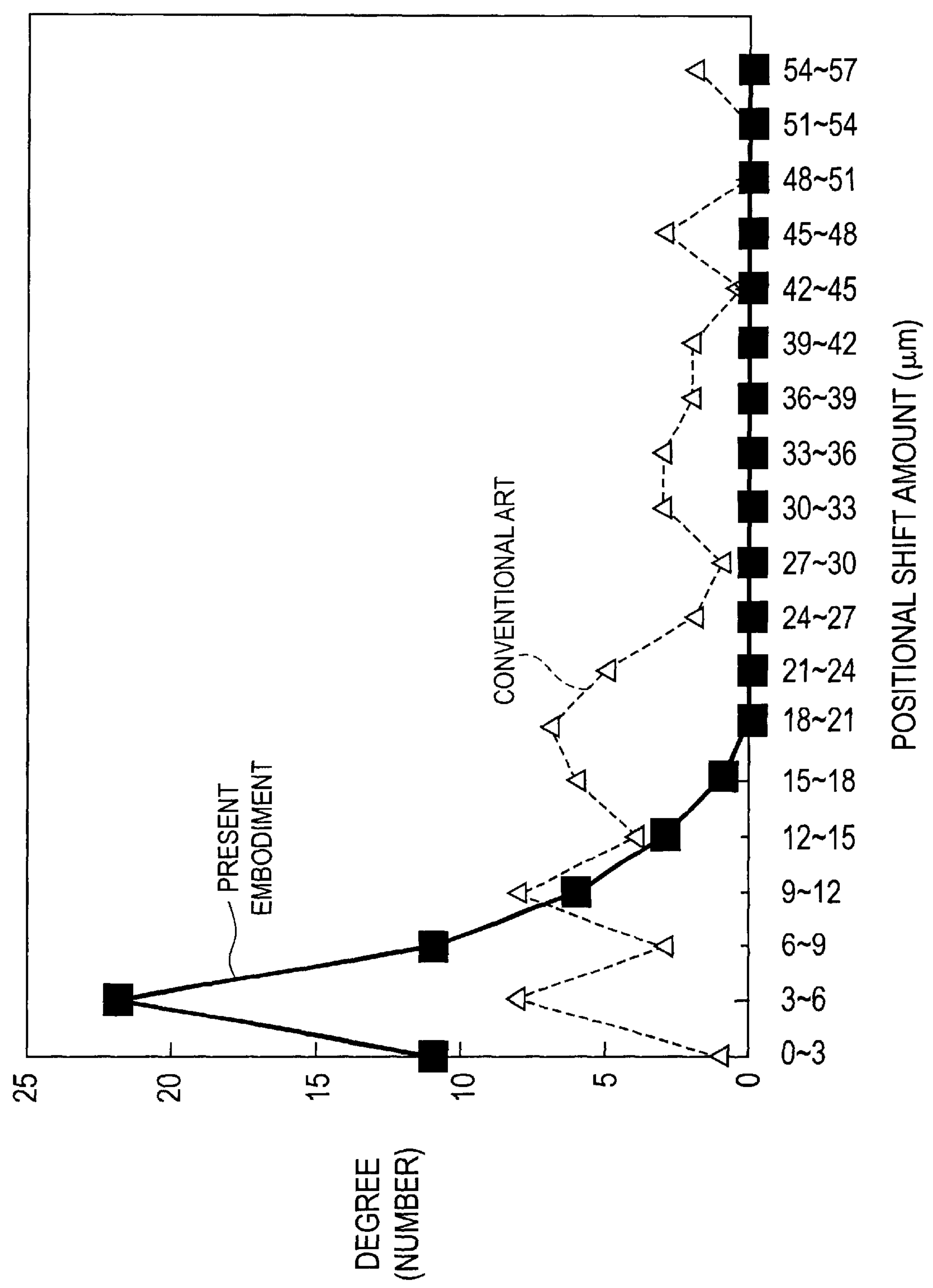
FIG. 5 is a graph showing the difference in distribution of pixel positional shift between the first embodiment in FIG. 1 and the conventional method.

In this case, the maximum allowable image-signal positional shift is 26.5 μm (={pixel width+width of adhesive-force changing portion}/2={40+13}/2). The positional shift amount of the color material particle 1 from the pixel central axis (=maximum color material positional shift amount) is ideally 6.5 μm (={width of adhesive-force changing portion}/2=13/2). That is, in the obtained image, a large amount of image-signal positional shift can be absorbed. FIG. 5 shows shift amounts from a position, measured with respect to 60 particles, in the image forming apparatus to which the present embodiment and the conventional method are applied. It is understood from this figure that in the present embodiment, in comparison with the conventional method, the positional shift amount can be greatly reduced, and excellent color material control is made with small variation.

Figure 6:
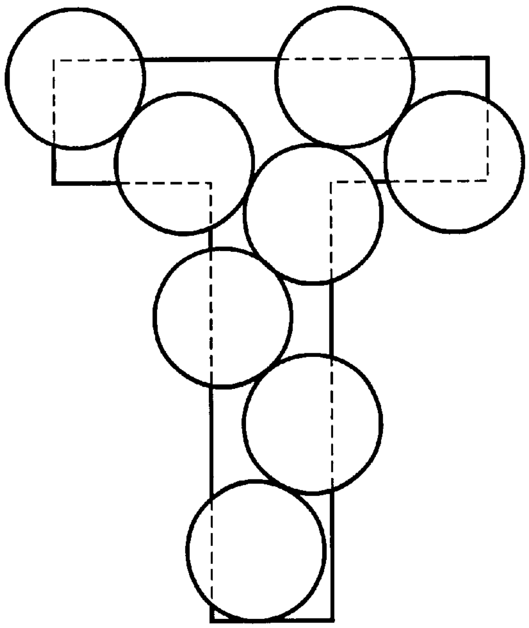
FIG. 6 is an explanatory diagram showing the difference in image samples between the first embodiment in FIG. 1 and the conventional method.
Figure 6:
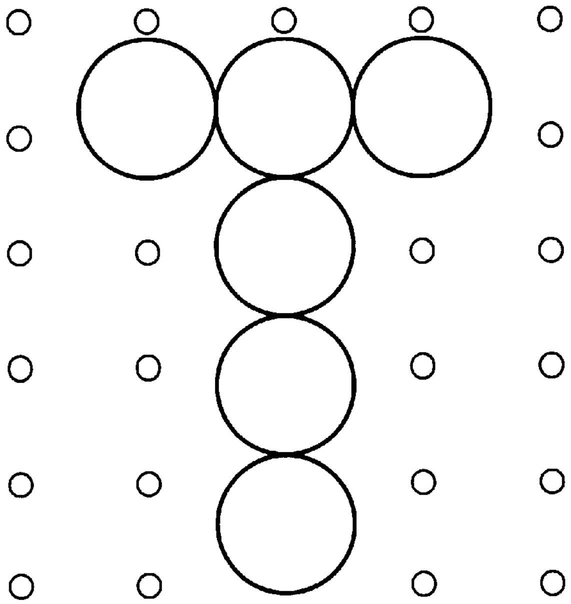

FIG. 6 shows image samples in the first embodiment in FIG. 1 and the conventional method. An alphabetic "T" is image-formed by the conventional method and the present embodiment. In the present embodiment, the image positional shift can be greatly suppressed. In the conventional method, hot-melt adhesive is applied to the entire "T" area, then light is emitted on the area, and color material particles are supplied to the area. On the other hand, in the present embodiment, the holes are filled with the hot-melt adhesive, then light is emitted in the shape of "T", and the color material particles are supplied to the light irradiated area.

Figure 7A:
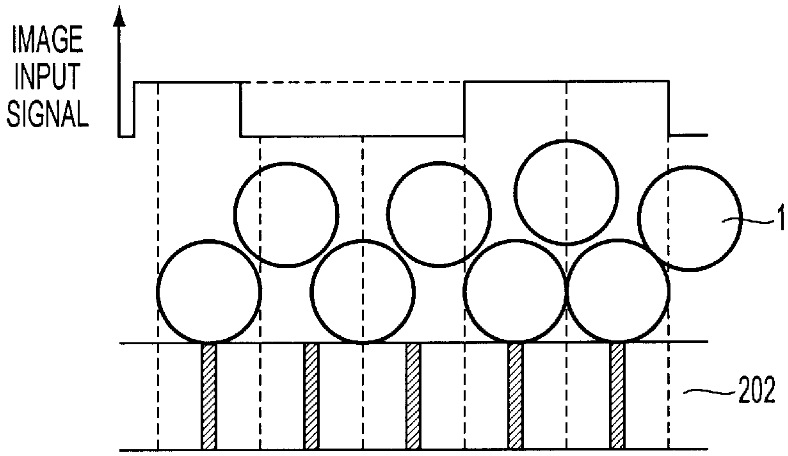
FIGS. 7A to 7C are explanatory diagrams showing steps of removing excessive color material particles on an image holder by a color material removing unit.
Figure 7B:
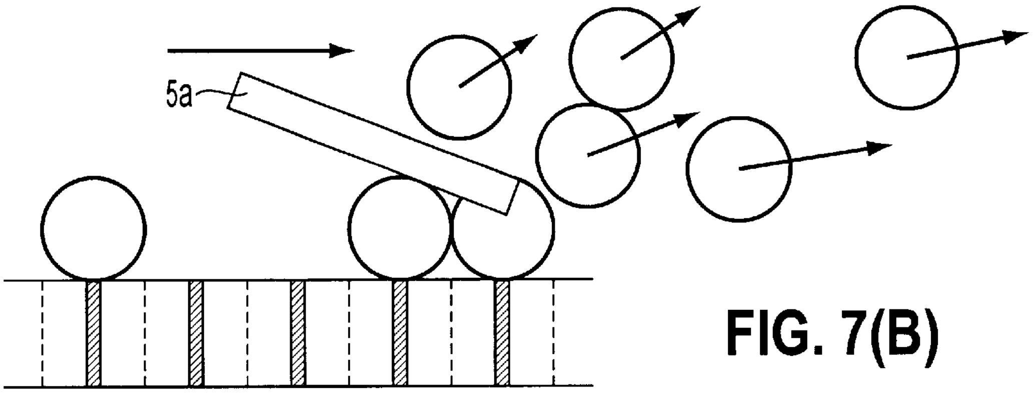
Figure 7C:
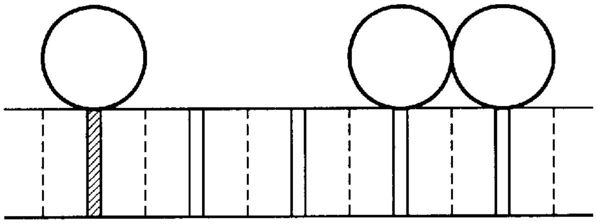

Again returning to FIG. 1, the image forming apparatus has an excessive color material removing unit 5 for removing excessive color material particles from the image on the image holding drum 2. The excessive color material removing unit 5 has a knife-edged blade 5*a* which is held a predetermined distance away from the image holding drum 2. As shown in FIGS. 7A to 7C, at this time, the frictional force caused by the mechanical scraping of the blade acts on the excessive parts.

FIG. 7A shows a status where an image signal has been inputted into the image holding drum 2 by light irradiation by the image-signal input unit 3, and the color material particles 1 are supplied by the color material supply unit 4. The color material particles are attached to the hot-melt adhesive only at pixels in which the image signal has been inputted. FIG. 7B shows a status where the blade 5*a* is moved relatively to the image holding drum 2. The color material particles with weak adhesive force are removed. As shown in FIG. 7C, the color material particles 1 remain only at the pixels corresponding to the image signal, thus an image is formed with the color material particles.

Figure 8:
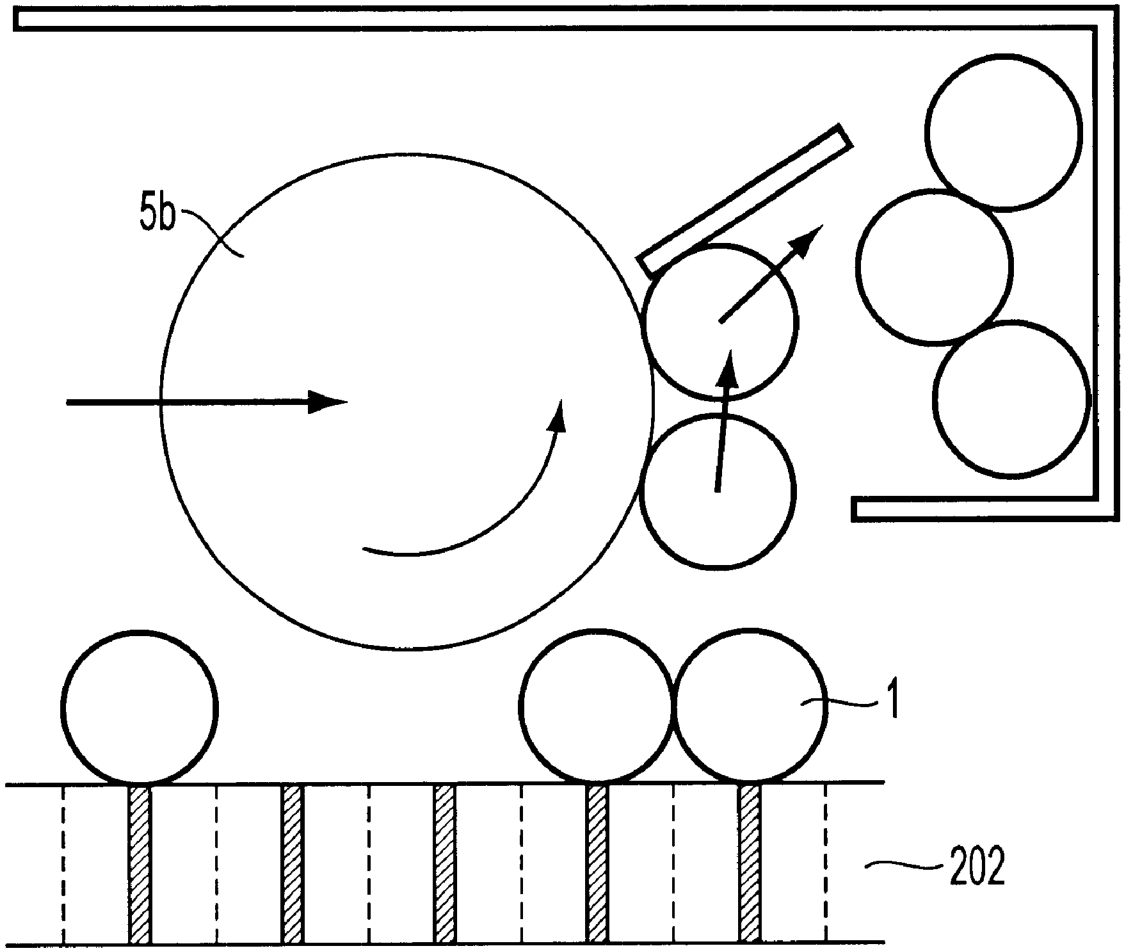
FIG. 8 is a cross sectional view showing the color material removing unit using viscosity or adhesive force by pressure sensitive adhesive or adhesive.

At this time, let $F_f$ be adhesive force of the hot-melt adhesive at an irradiated pixel, $F_n$ be adhesive force of a pixel which has not been irradiated, and $F_e$ be removal force by the excessive color material removing unit such as the knife-edged blade, $F_f>F_e>F_n$ must hold. If this condition is satisfied, the color material particles except the color material particles attached to the hot-melt adhesive 203 in the image portion can be removed. In use of the blade, the removal force is determined by the position, the shape, the elasticity and the like of the blade. Further, as shown in FIG. 8, pressure sensitive adhesive or adhesive, provided on the surface of a relative-rotary and movable roller 5*b*, may be employed as the color material removing unit, in addition to the blade.

In FIG. 1, when the excessive color material particles have been removed by the excessive color material removing unit 5, and an image has been formed with the color material particles on the image holding drum 2, a fixing unit 6 performs fixing processing so as to prevent positional shift of the color material particles constituting the image from each other. In this embodiment, lamination processing by using adhesive or pressure sensitive adhesive is performed as the fixing processing. The lamination processing is made by slide-applying molten pressure sensitive adhesive or adhesive to the image holding drum 2 by a rotate-driven heat roller 6*a*.

Figure 9A:
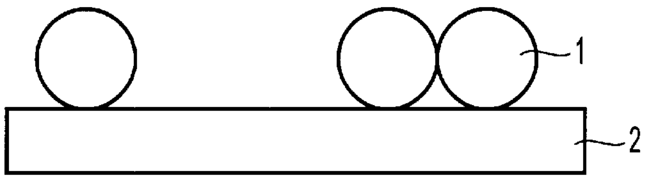
FIGS. 9A and 9B are conceptual cross sectional views showing lamination processing.
Figure 9B:
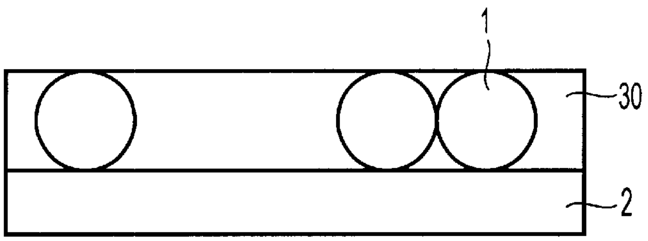

FIGS. 9A and 9B are conceptual cross sectional views showing the lamination processing. In this processing, an image of the color material particles 1 formed on the image holding drum 1 as shown in FIG. 9A is laminated with pressure sensitive adhesive/adhesive 30 as shown in FIG. 9B. This fixes the color material particles 1. In comparison with a case where the lamination processing has been omitted, corruption of the image at the next stage of image transfer can be prevented.

The image on the image holding drum 2 passed through the above processes is transferred onto a print sheet 9 as a final medium. The print sheet 9 is provided so as to be held between the image holding drum 2 and a pressure heat-transfer roller 10, and at the same time of pressure application, the heat of the pressure heat-transfer roller 10 is conducted through the print sheet 9 to the color material particles 1 on the image holding drum 2. This heat-melts the color material particles 1 and decreases their viscosity. As the color material enters gaps among the fibers of the print sheet, the color material can be completely fixed there. The transfer fixing is made as described above.

Figure 10:
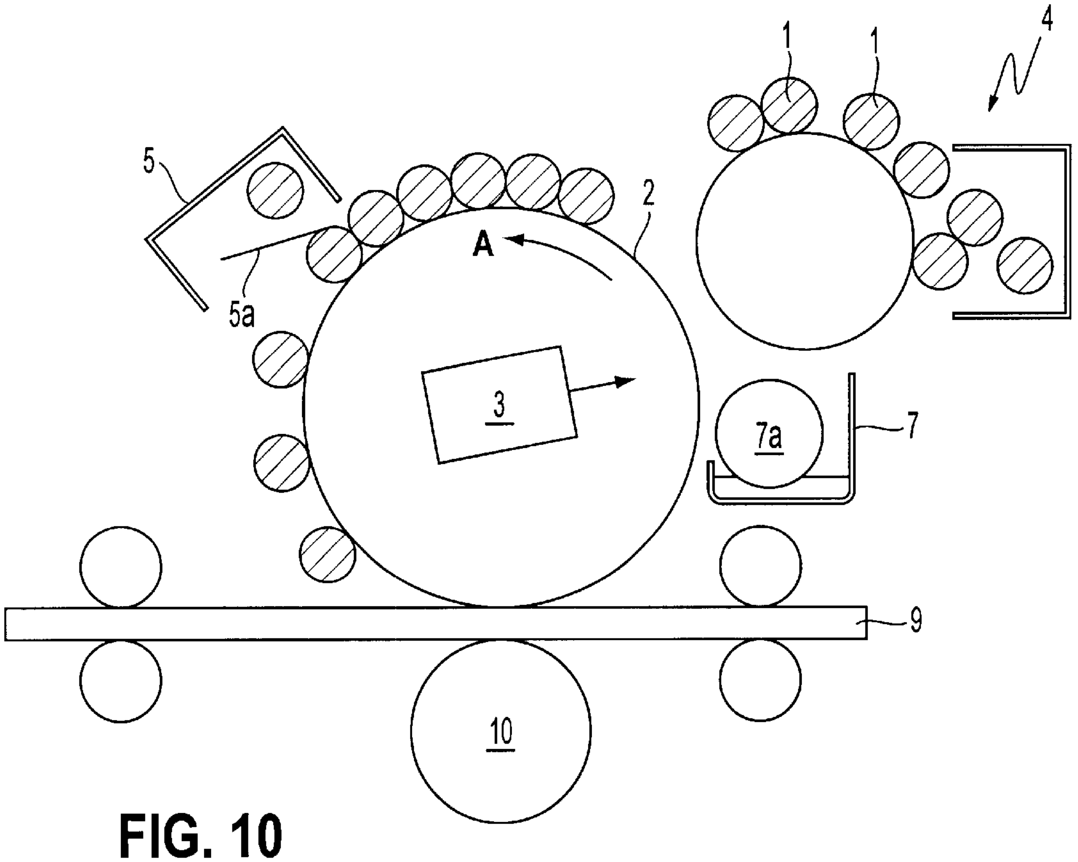
FIG. 10 is a cross sectional view showing the structure of the image forming apparatus according to a second embodiment of the present invention.

FIG. 10 is a cross sectional view showing the structure of the image forming apparatus according to a second embodiment of the present invention. The difference from the first embodiment in FIG. 1 will be described. Note that FIG. 1 shows the fixing unit 6, however, as the fixing unit 6 should not be necessarily provided, to avoid illustrative complication, the fixing unit is not shown in some of the following embodiments.

The second embodiment in FIG. 10 utilizes liquid crosslinking force as the adhesive force of the image holding drum 2 to the color material particles 1. For this purpose, the image holding drum 2 has the following structure, and is constructed as a transparent body. Further, the second embodiment in FIG. 10 provides a liquid supply unit 7 having a liquid supply drum 7*a* to supply liquid to the image holding drum 2.

Figure 11:
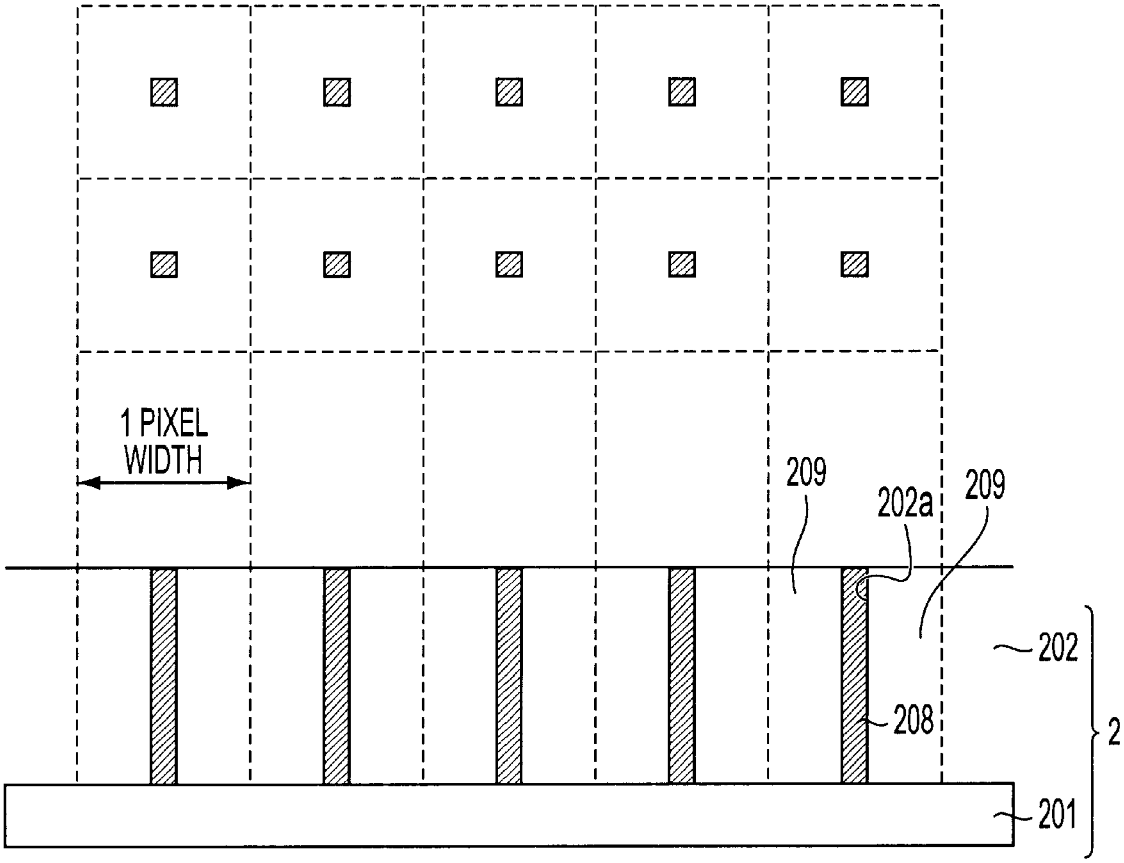
FIG. 11 is a cross sectional view with a projected plan view showing the structure of the image holding drum in the second embodiment in FIG. 10.

FIG. 11 is a cross sectional view showning the structure of the image holding drum 2, with a projected plan view showing the surface of the image holding drum 2, when liquid crosslinking force is employed as the adhesive force on the image holding drum 2 which changes based on an image signal. The image holding drum 2 has a porous layer 202 formed of water repellent material 209. The porous layer 202 has holes 202*a* filled with hydrophilic material 208.

Figure 12A:
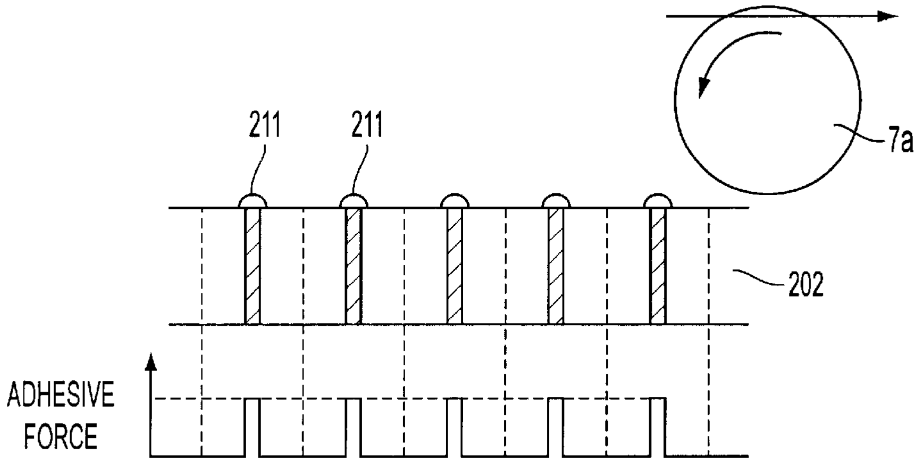
FIGS. 12A to 12C are explanatory diagrams showing an image formation process in the second embodiment in FIG. 10.
Figure 12B:
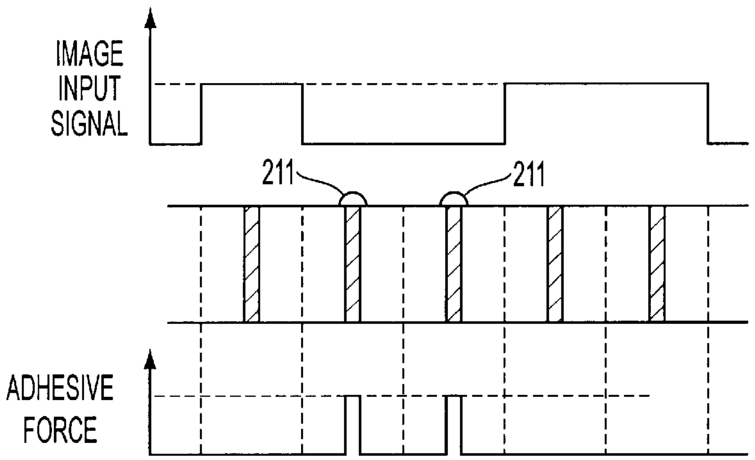

FIGS. 12A and 12B show the image formation process in the second embodiment in FIG. 10. As shown in FIG. 12A, liquid drops 211 are formed only in the hydrophilic 208 areas by relatively moving the rotate-driven liquid supply drum 7*a* on the porous layer 202 of the image holding drum 2, and if color material is supplied, liquid crosslinking force is generated.

Figure 12C:
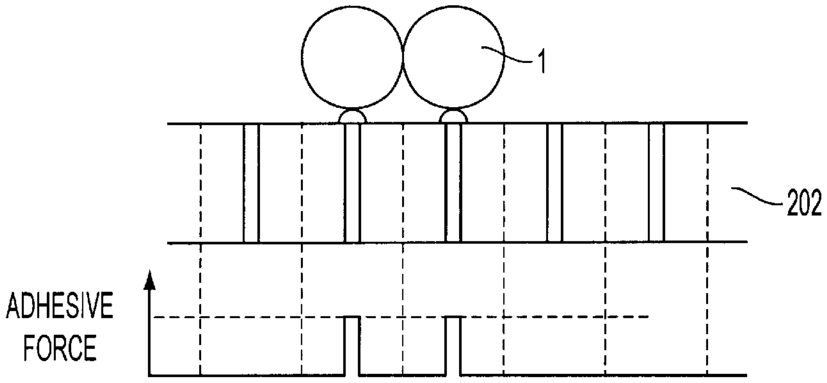

Then, the liquid drops on the non-image-forming portion are irradiated with a light stimulus based on an image signal. The temperature of the irradiated liquid drops increases by optical-energy absorption and the liquid drops evaporate (FIG. 12B). With the temperature rise and evaporation, in the non-image forming portion, the liquid cross-linking force in color material supply disappears, and the adhesive force distribution changes. Thereafter, the color material supply unit 4 supplies color material (FIG. 12C), and processing similar to that in use of hot-melt adhesive is performed. Thus, the image formation is completed.

In this embodiment, the liquid crosslinking force is used for image formation, however, in case of using the liquid crosslinking force as transfer force of transfer unit or removal force of color material removing unit, as liquid drops are not necessarily discretely arranged, a uniform liquid film may be formed on the surface of the unit. At this time, liquid crosslinking force occurs naturally between the color material on the image holding drum and the surface of the unit only by rubbing the transfer unit or the color material removing unit against the image holding drum.

Further, electrostatic force, magnetic force and chemical bonding force may be used as the adhesive force between the image holding drum and the color material particles, the transfer force of the transfer unit, and the removal force of the color material removing unit, in accordance with the same basic idea. In use of electrostatic force or magnetic force, an electrostatic latent image or magnetic latent image having regularly-discrete distribution is formed on the image holding drum, and charged particles or magnetic particles are used. Note that as described in the problems of the conventional techniques, if the color material particles are discharged at an effective electric-field threshold value or effective magnetic-field threshold value, attachment positions of the color material particles are shifted due to a low contrast. To prevent the positional shift, it is preferable to form an electrostatic latent image or magnetic latent image in a state where the discharge start positions of the color material particles 1 and the discharge destination positions are not separated but attached to each other so as to avoid discharge of color material particles, and to change the adhesive force.

The color material is not necessarily powdery particles containing pigment or dyestuff, but may be liquid-containing capsules or liquid drops.

Figure 13:
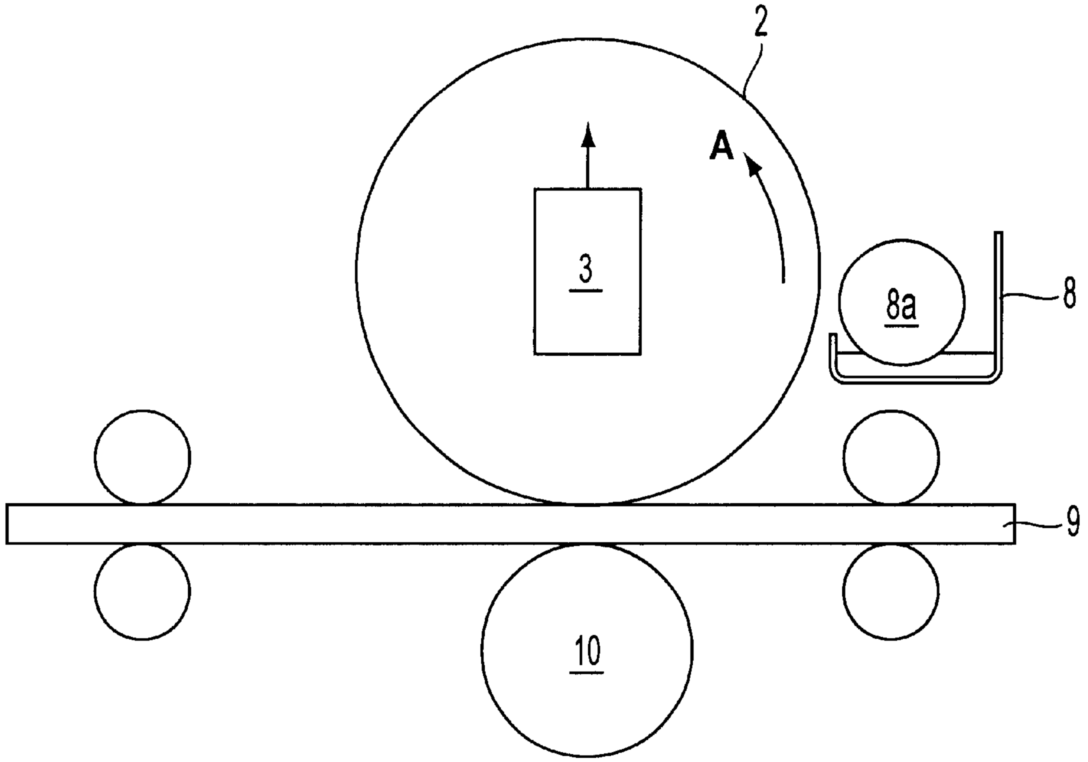
FIG. 13 is a cross sectional view showing the structure of the image forming apparatus according to a third embodiment of the present invention.

FIG. 13 is a cross sectional view showing the structure of the image forming apparatus according to a third embodiment of the present invention. FIGS. 14A and 14B are explanatory diagrams showing the image formation process in the third embodiment in FIG. 13. In the third embodiment, the image forming apparatus uses liquid drops as the color material.

Similarly to the second embodiment described with reference to FIGS. 10 to 12A and 12B, in the image forming apparatus in FIG. 13, the image holding drum 2 has the porous layer 202 of water repellent material with holes filled with hydrophilic material. Further, the third embodiment in FIG. 13 provides a liquid supply unit 8 having a liquid supply drum 8*a* to supply liquid containing color material to the image holding drum 2. As shown in FIG. 14A, liquid drops 212 are formed only in the hydrophilic material areas by moving the rotate-driven liquid supply drum 8*a* on the image holding drum 2. Then, the liquid drops in the non-image-forming portion on the image holding drum 2 is irradiated with a light stimulus based on an image signal. The temperature of the irradiated liquid drops increases by optical-energy absorption and the liquid drops evaporate. Thus, an image is formed on the image holding drum 2 (FIG. 14B). Then, the pressure heat-transfer roller 10 and the image holding drum press the print sheet 9 held therebetween, and the liquid drops 202 on the image holding drum 2 permeate into fibers of the print sheet 9 by capillary force. Thus, the transfer is completed.

FIG. 15 is a schematic diagram showing the structure of a capsule particle containing liquid. In FIG. 15, the capsule is cut into halves, and the two parts are shifted from each other. The capsule particles have two advantages. As solid color material, the capsule particles can be stored in discrete state. Further, as liquid color material, the capsule particles enable transfer utilizing capillary force. The capsule particles are synthesized by utilizing phase separation caused in the interface between two types of nonmiscible liquid when they are mixed, poly-ion complex reaction in Coulomb-force binding between oppositely-charged two polymeric chains, or interfacial polymerization/polycondensation. For example, the capsule particles are synthesized by uniformly dispersing liquid film substance in color material liquid and rapidly cooling the liquid to gel the film substance. Pigment and dyestuff are used as color material containing liquid 213. A covering film 214 must have a stable film-breaking pressure value. The difference from the above embodiments is that upon image transfer onto a print sheet, the print sheet is supplied between the pressure transfer roller and the image holding drum such that the print sheet is pressed therebetween. At this time, the pressure breaks the covering film 214 of the capsule particle, and the contained liquid color material permeates into the fibers of the print sheet by capillary force, thus, the transfer is completed.

Next, description will be made on the image forming apparatus in which the image-signal input unit performs image input after the color material supply unit supplies color material onto the image holder.

Figure 16:
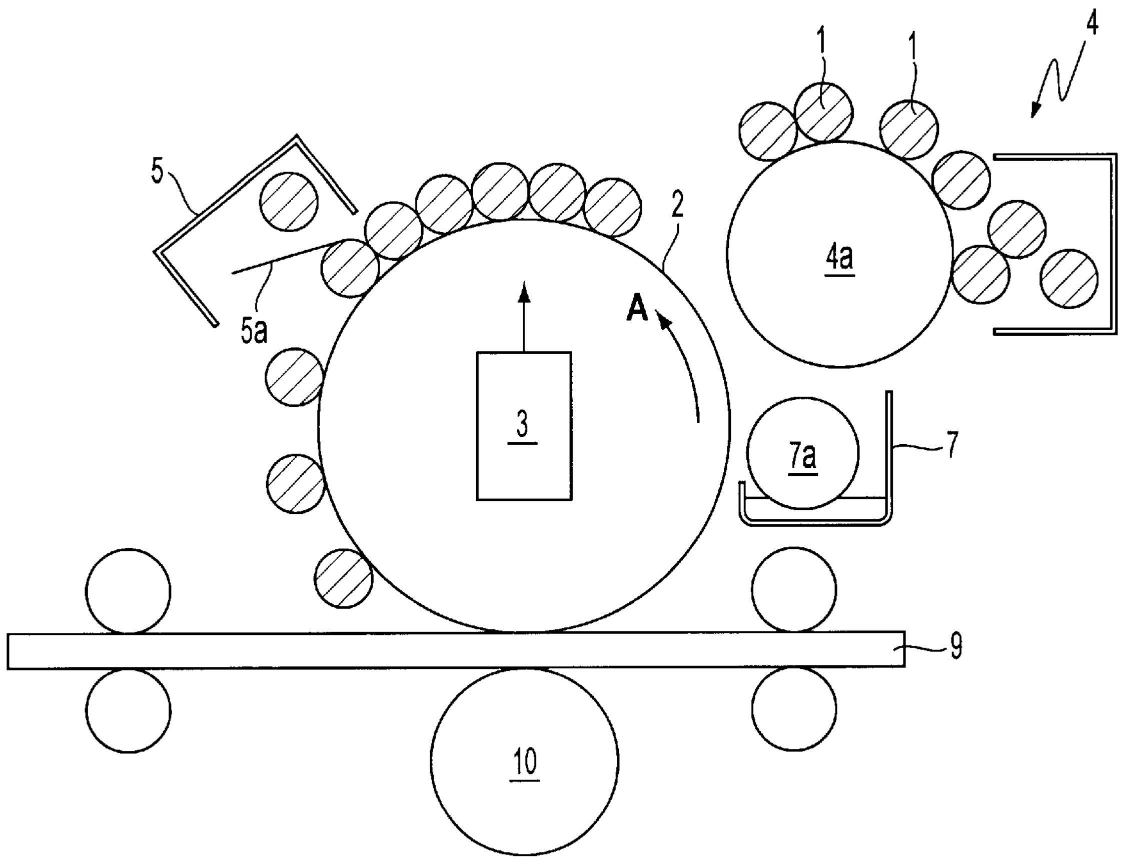
FIG. 16 is a cross sectional view showing the structure of the image forming apparatus according to a fourth embodiment of the present invention.

FIG. 16 is a cross sectional view showing the structure of the image forming apparatus according to a fourth embodiment of the present invention. FIGS. 17A to 17D are explanatory diagrams showing the image formation process in the fourth embodiment in FIG. 16.

In comparison with the second embodiment in FIG. 10 where the image-signal input unit 3 supplies an image signal to the image holding drum 2 and then the color material supply unit 4 supplies the color material particles 1 onto the image holding drum 2, in the fourth embodiment in FIG. 16, the color material supply unit 4 supplies the color material particles 1 onto the image holding drum 2 and then the image-signal input unit 3 supplies an image signal to the image holding drum 2.

Similarly to the second embodiment in FIG. 10, the image holding drum 2 of the fourth embodiment in FIG. 16 has the porous layer 202 of the water repellent material 209 having holes 202*a* filled with hydrophilic material 208.

Figure 17A:
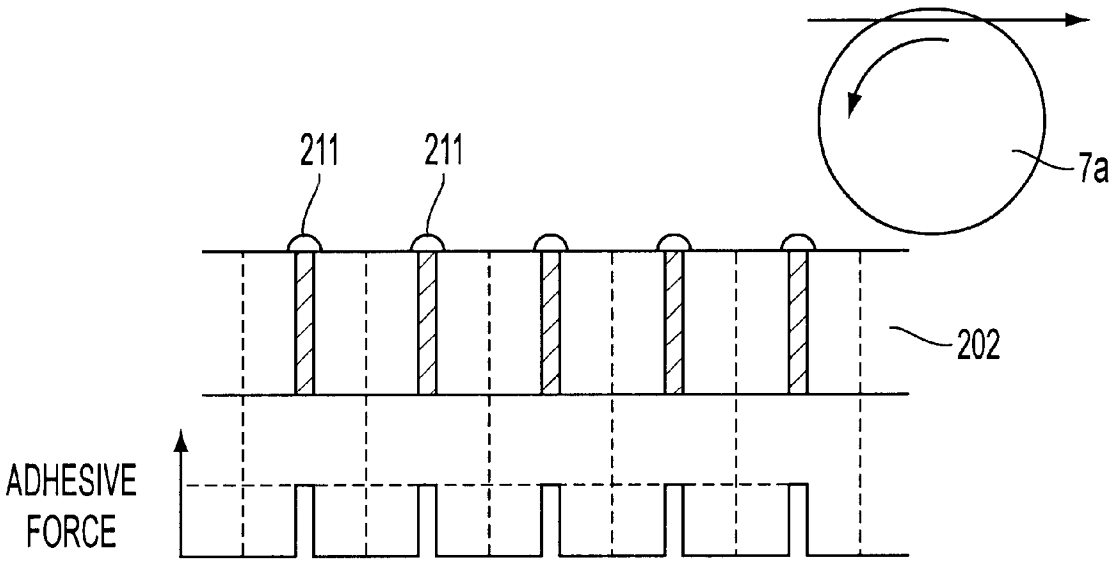
FIGS. 17A to 17D are explanatory diagrams showing the image formation process in the fourth embodiment in FIG. 16.

As shown in FIG. 17A, the liquid drops 211 are formed only in the hydrophilic 208 areas by moving the rotate-driven liquid supply drum 7*a* on the porous layer 202 of the image holding drum 2. The image holding drum 2 having a transparent body includes a light irradiation unit (image-signal input unit 3) for light irradiation in correspondence with an image signal. The image-signal input unit 3 may include an LED unit or semiconductor laser for, e.g., 300 to 1200 dpi.

Figure 17B:
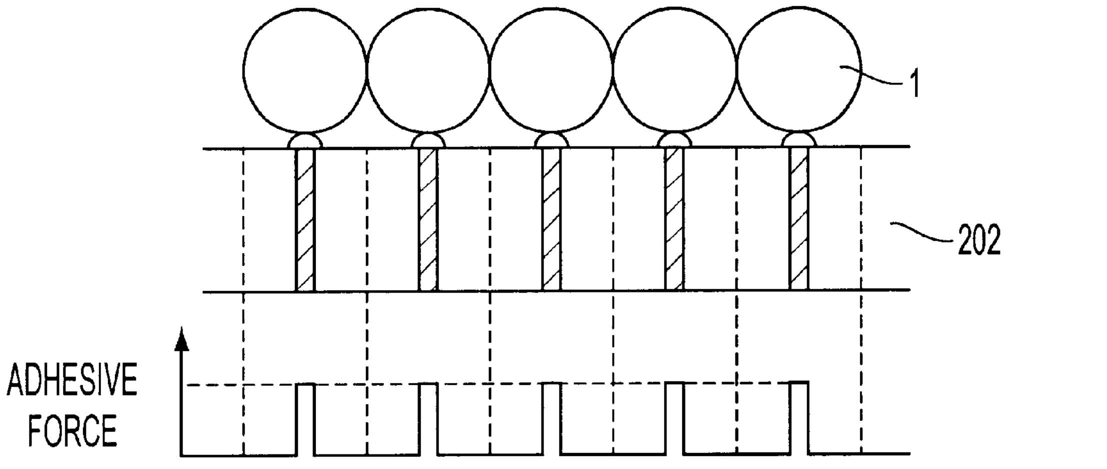

As the color material supply unit 4 slide-applies the color material particles to the image holding drum where the liquid drops are discretely provided, the color material particles can be discretely provided, and further, a layer of the color material particles having a uniform thickness can be formed (FIG. 17B).

Figure 17C:
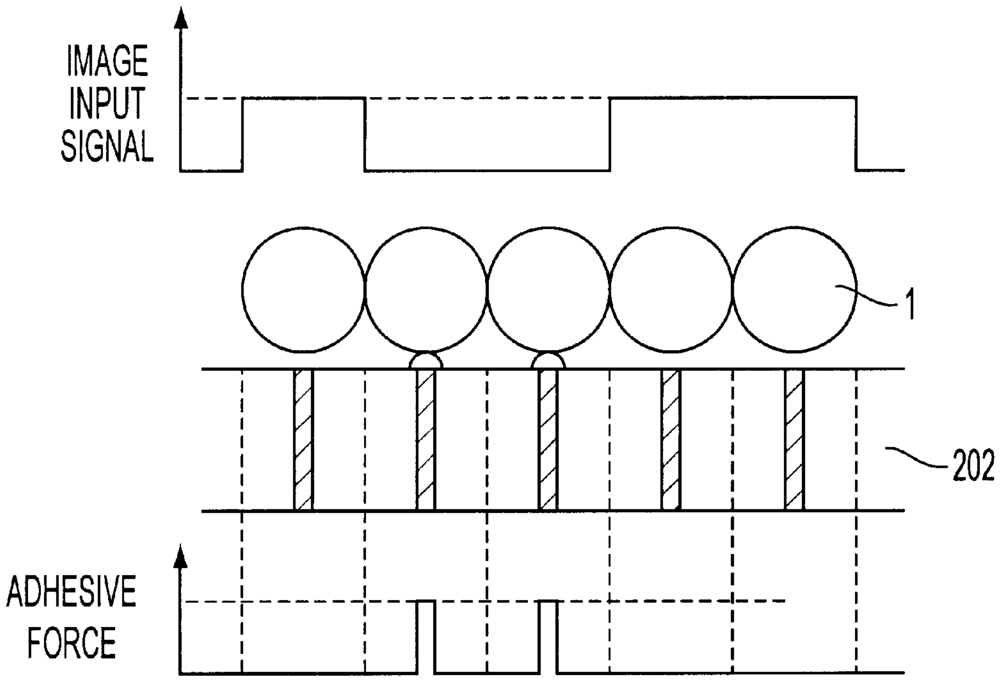

When the image-signal input unit 3 emits light based on an image signal sent from an image-signal processing unit (not shown), the light stimulus passes through the area of the transparent image holding drum 2, and radiates the liquid drops formed between the color material particles in the non-image-forming portion on the image holding drum and the image holding drum. Then, the temperature of the irradiated liquid drops increases by optical-energy absorption and the liquid drops evaporate. With the temperature rise and evaporation, the liquid cross-linking force in the non-image forming portion disappears, and the adhesive force distribution changes (FIG. 17C).

Figure 17D:
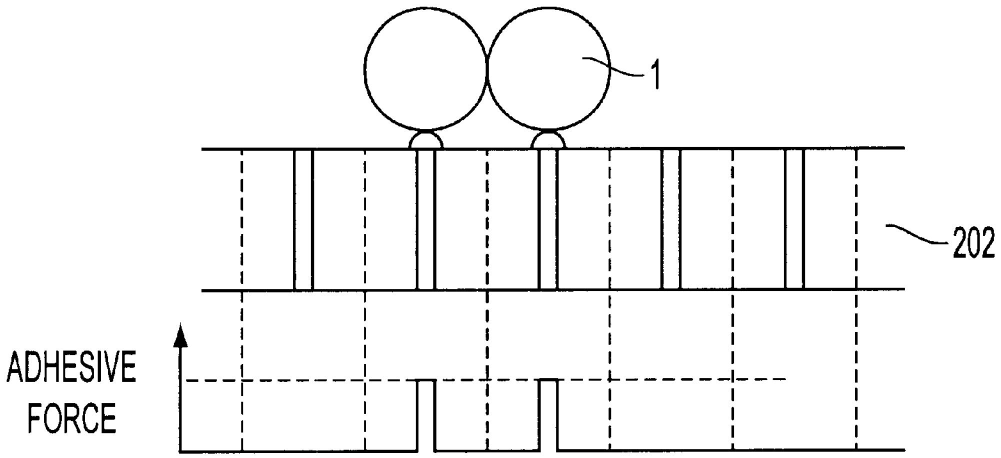

To remove excessive color material particles from the image on the image holding drum 2, the knife-edged blade 5*a* is held a predetermined distance away from the transparent image holding drum 2. At this time, the frictional force caused by the mechanical scraping of the blade 5*a* acts on the excessive particles. At this time, let $F_f$ be adhesive force of unirradiated color material particles by the crosslinking force after the image-signal input, $F_n$ be adhesive force of color material particles at an irradiated pixel which has lost the liquid crosslinking force, and $F_e$ be removal force by the excessive color material removing unit such as the knife-edged blade, $F_f>F_e>F_n$ must hold. If this condition is satisfied, the color material particles except the color material particles in the image portion can be removed (FIG. 17D).

In addition to the above-described structures in the respective above embodiments, the image holding drum has other structures, e.g., a discretely-arranged film type structure, an electrode brush structure, a filter structure, a transparent porous type structure and the like.

Hereinbelow, the other structures will be described.

Figure 18:
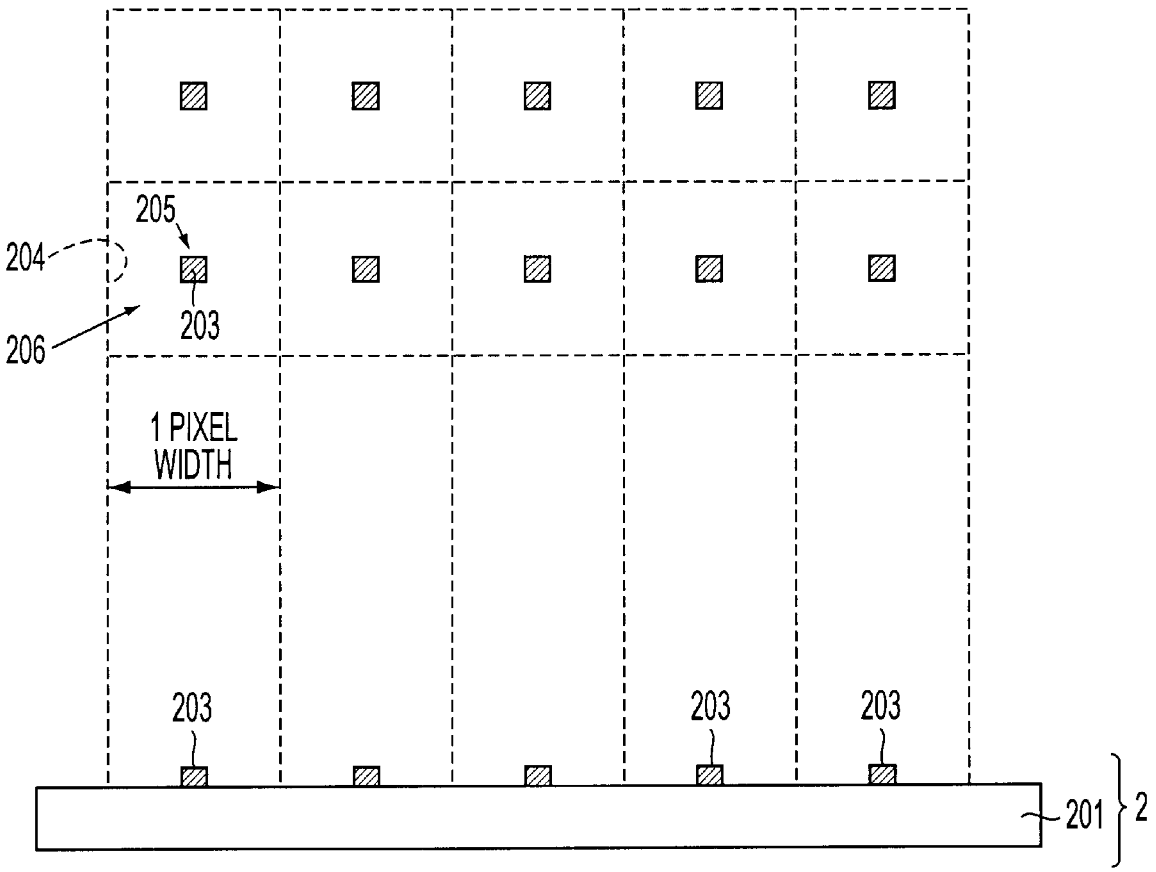
FIG. 18 is a cross sectional view with a projected plan view showing an example of the structure of the image holder.

As shown in FIG. 18, as the discretely-arranged film type structure, the surface of the image holding drum 2 is coated with substance which changes its adhesive force, e.g., hot-melt adhesive 203, regularly at each pixel pitch, in a width smaller than the pixel width. In this arrangement, the image holding drum 2 does not necessarily have a porous structure. Note that although depending on the coat film thickness, in comparison with general porous structure having holes filled with adhesive, the volume of the substance that changes its adhesive force is smaller, therefore, substance which generates strong adhesive force must be selected. In the case of the discretely-arranged film type structure in FIG. 18, the image forming apparatus has the same construction of that in FIG. 1.

Figure 19:
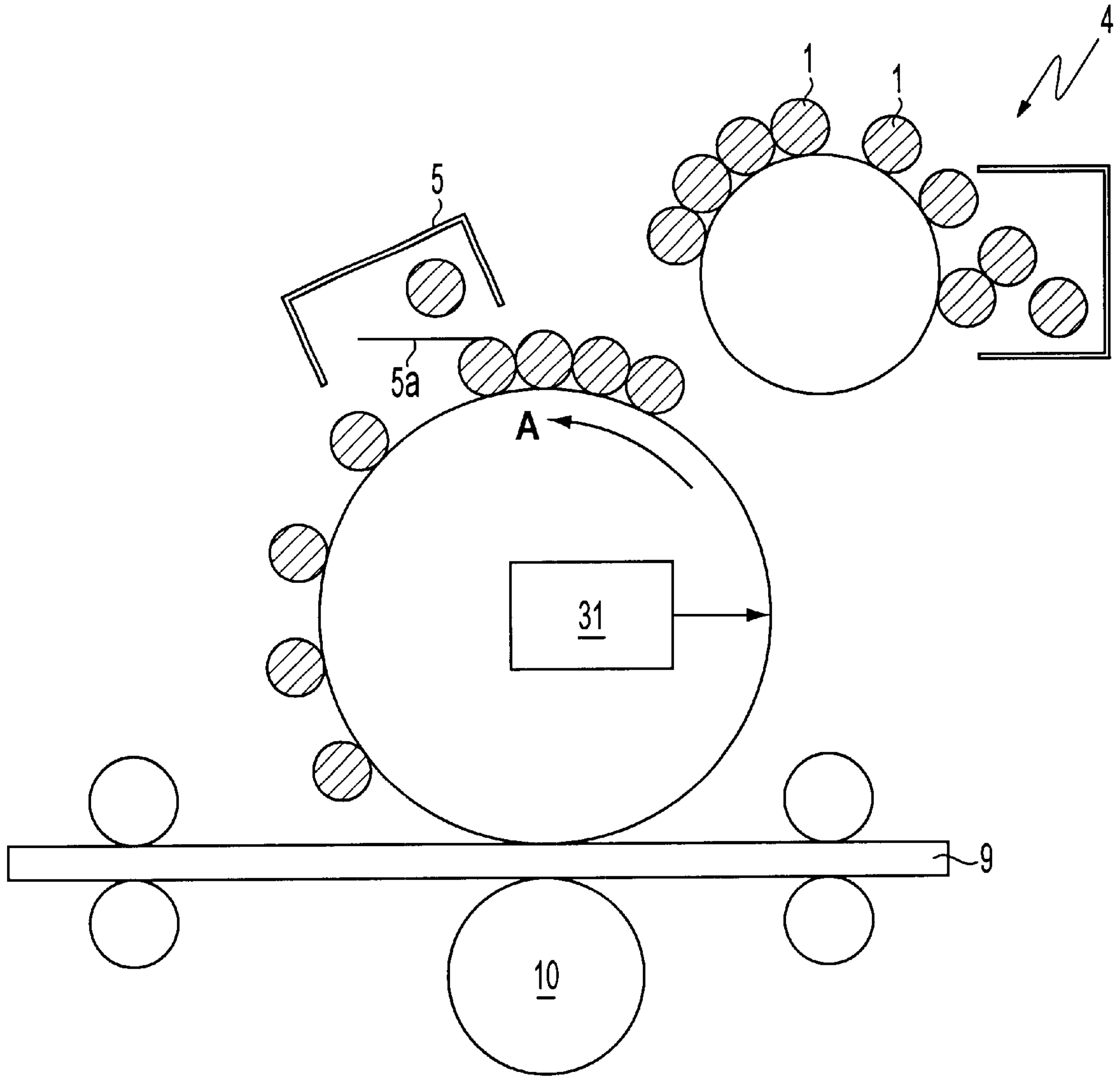
FIG. 19 is a cross sectional view showing the structure of the image forming apparatus according to a fifth embodiment of the present invention.

FIG. 19 is a cross sectional view showing the structure of the image forming apparatus according to a fifth embodiment of the present invention. In this embodiment, the electrode brush structure will be described with reference to FIG. 19. As described below, in the case of the electrode brush structure, an image-signal input unit 31 supplies an image signal, not as light irradiation but as electric energy, to the image holding drum 2.

Figure 20:
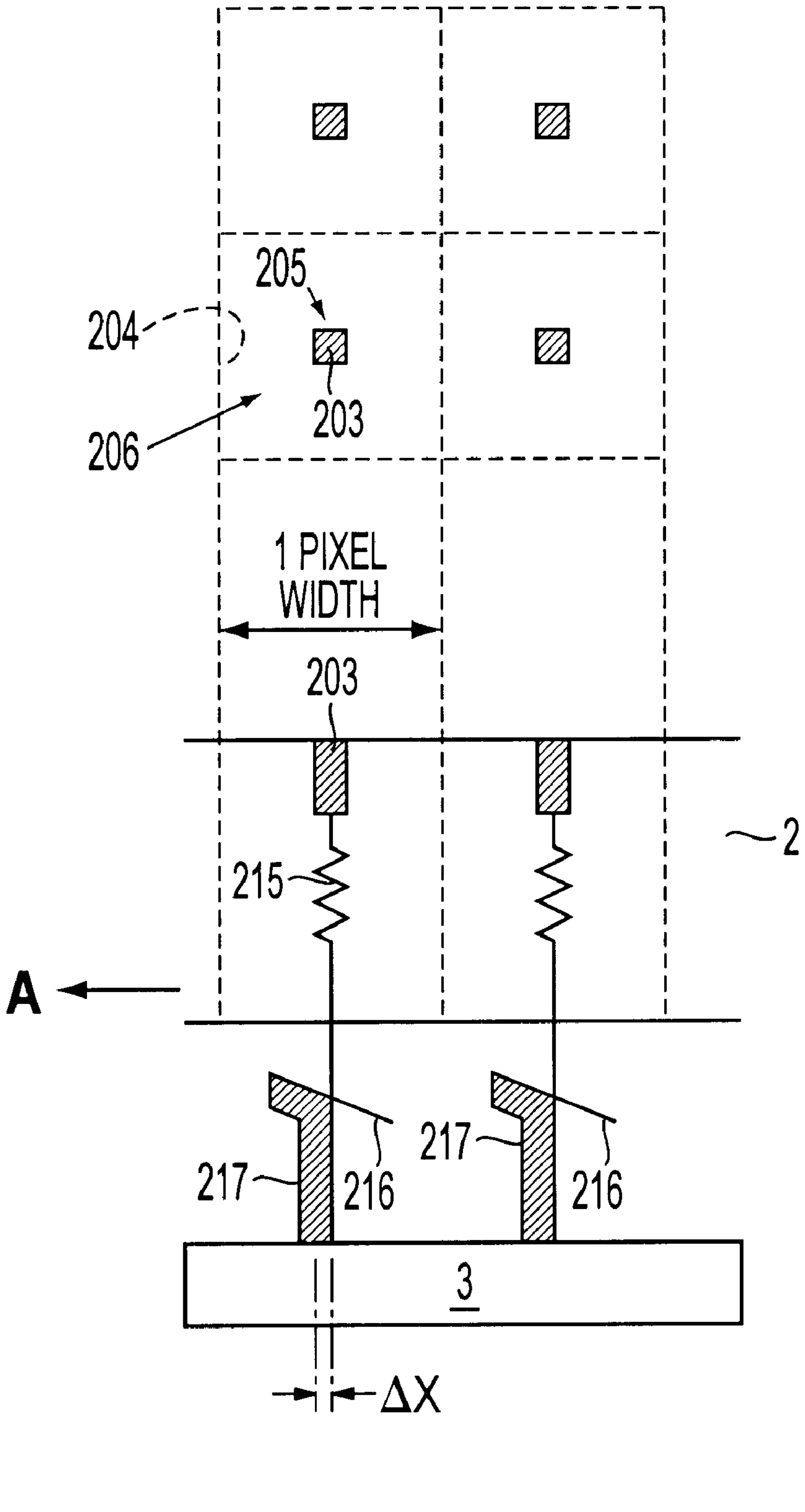
FIG. 20 is a cross sectional view with a projected plan view showing an example of the structure of the image holder.

As shown in FIG. 20, the electrode brush structure is formed by filling the image holding drum with the hot-melt adhesive 203, and arranging heat generation resistors 215 for converting electric energy into thermal energy, immediately under the hot-melt adhesive, for respective pixels. That is, the heat generated by the electric energy input melts the hot-melt adhesive 203, and changes the adhesive force. An electrode slide-application portion 216 is provided for each pixel under the porous layer, in a width smaller than the pixel width. The electrode slide-application portions 216 are connected to the above-described heat generation resistors 215. The image-signal input unit 31 has voltage supply brushes 217, provided for respective pixels, connected to the image-signal processing unit (not shown). If an image signal is inputted while the image holding drum 2 is rotated in an arrow A direction, relative positional shift $\Delta x$ occurs. However, if the positional shift $\Delta x$ is less than the size of the electrode slide-application portion 216, conduction occurs between the voltage supply brush 217 and the electrode slide-application portion 216 to melt the hot-melt adhesive 203. Further, the electrode slide-application portion 216 inclines in the rotation direction of the image holding drum with a fixed portion as a center, and the voltage supply brush 217 comprises an elastic member. By this arrangement, mutually sufficient conduction can be obtained by the elastic deformation of the voltage supply brush 217. Further, the length of the voltage supply brush 217 is not necessarily fixed but may be within a predetermined range.

Figure 21:
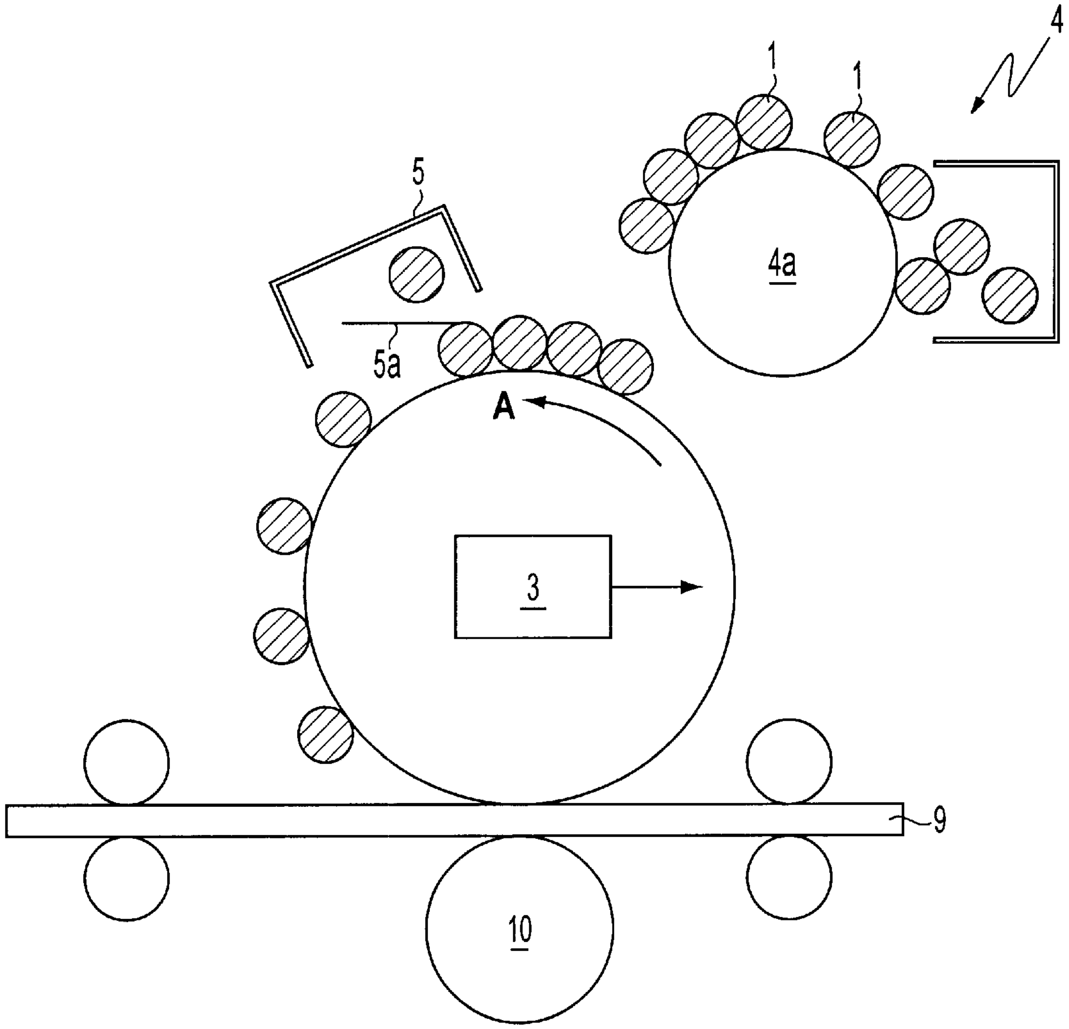
FIG. 21 is a cross sectional view showing the structure of the image forming apparatus according to a sixth embodiment of the present invention.
Figure 22A:
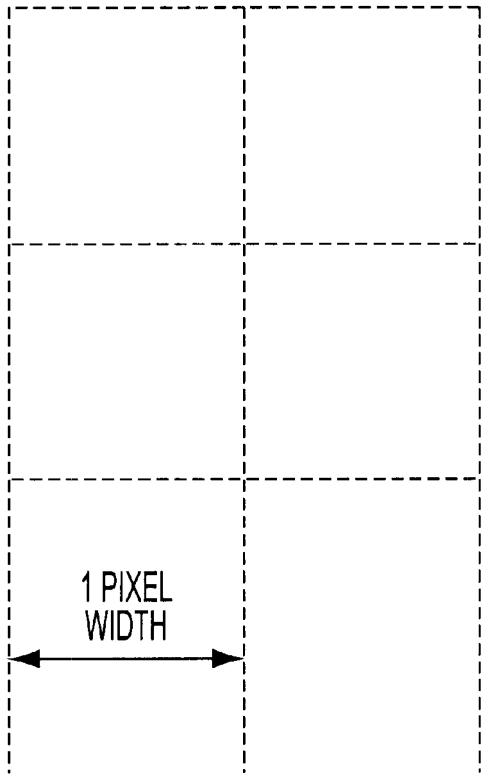
FIGS. 22A and 22B are a plan view and a cross sectional view showing an example of the structure of the image holder.
Figure 22B:
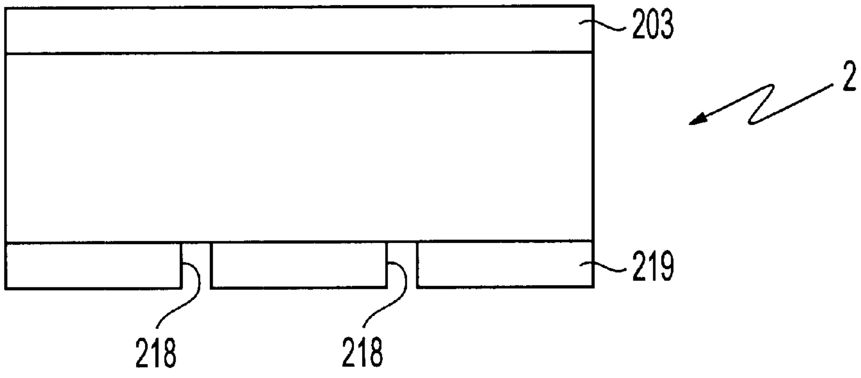

FIG. 21 is a cross sectional view showing the structure of the image forming apparatus according to a sixth embodiment of the present invention. In this embodiment, the filter structure will be described.

As the image holding drum having the filter structure, a layer of the hot-melt adhesive 203 is provided on the surface layer of the transparent image holding drum 2, further, a filter 219 having holes 218 smaller than the pixels, each provided for each pixel, is provided on the rear surface of the image holding drum. The filter 219 is fixed to the image holding drum 2 so as not to change the relative position to the image holding drum 2, and rotates with the image holding drum 2. As shown in FIG. 21, the transparent image holding drum 2 includes the image-signal input unit 3 that performs light irradiation based on an image signal. The image-signal input unit 3 may include an LED unit or semiconductor laser for, e.g., 300 to 1200 dpi. The image-signal input unit 3 melts the hot-melt adhesive by light stimulus irradiation based on an image signal sent from the image-signal processing unit (not shown), to change the adhesive force.

Figure 23A:
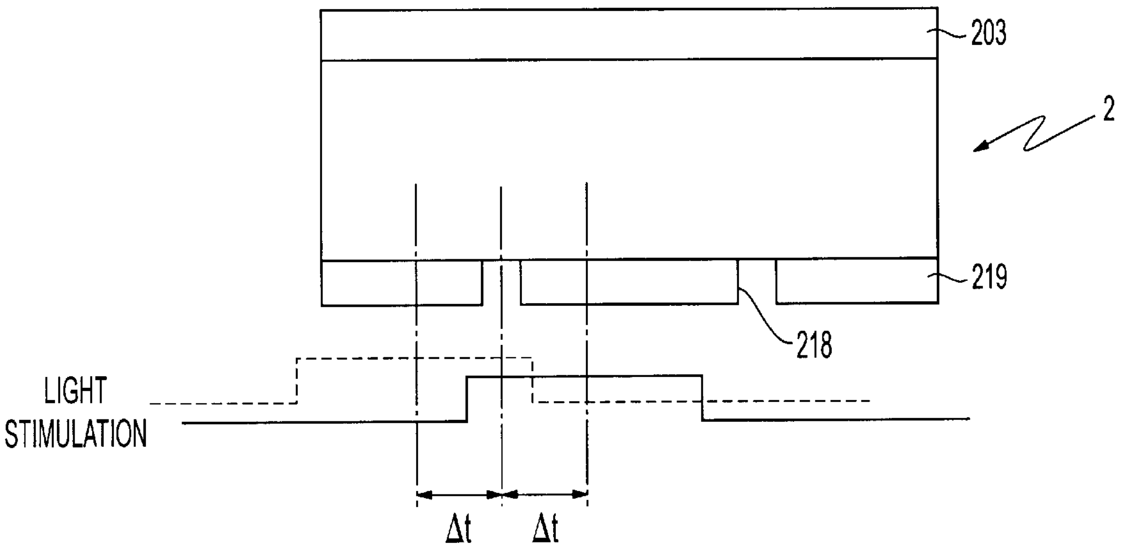
FIGS. 23A and 23B are explanatory diagrams showing the operation of the image holder in FIGS. 22A and 22B.
Figure 23B:
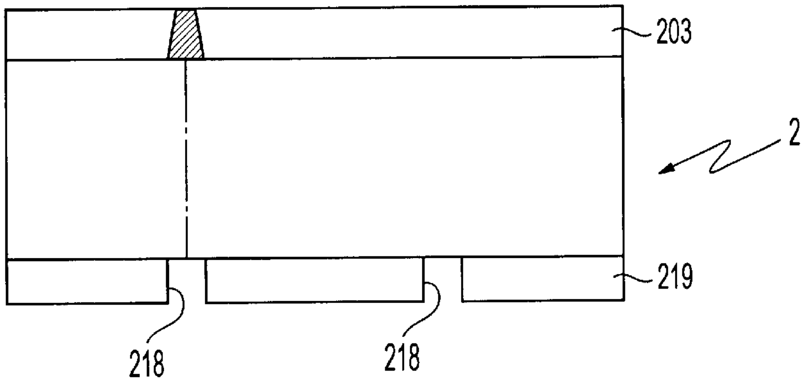

FIG. 23A shows the image holding drum 2 receiving the light stimulus by the image-signal input unit 3. FIG. 23B shows the hot-melt adhesive melted by the light stimulus. In the light stimulus, only light which passes through the filter can melt the hot-melt adhesive. Even if the positional shift $\Delta x$ exists in the image input signal, the shift is corrected if it is within a predetermined range. In the layer of the hot-melt adhesive 203, only areas corresponding to the holes 208 are melted. Thereafter, similarly to the first embodiment in FIG. 1, the color material supply unit 4 supplies the color material particles 1 to the surface of the image holding drum 2 on the hot-melt adhesive layer side, and excessive color material particles are removed by the blade 5*a* of the excessive color material removing unit 5. Thus, an image is formed on the image holding drum 2.

Figure 24:
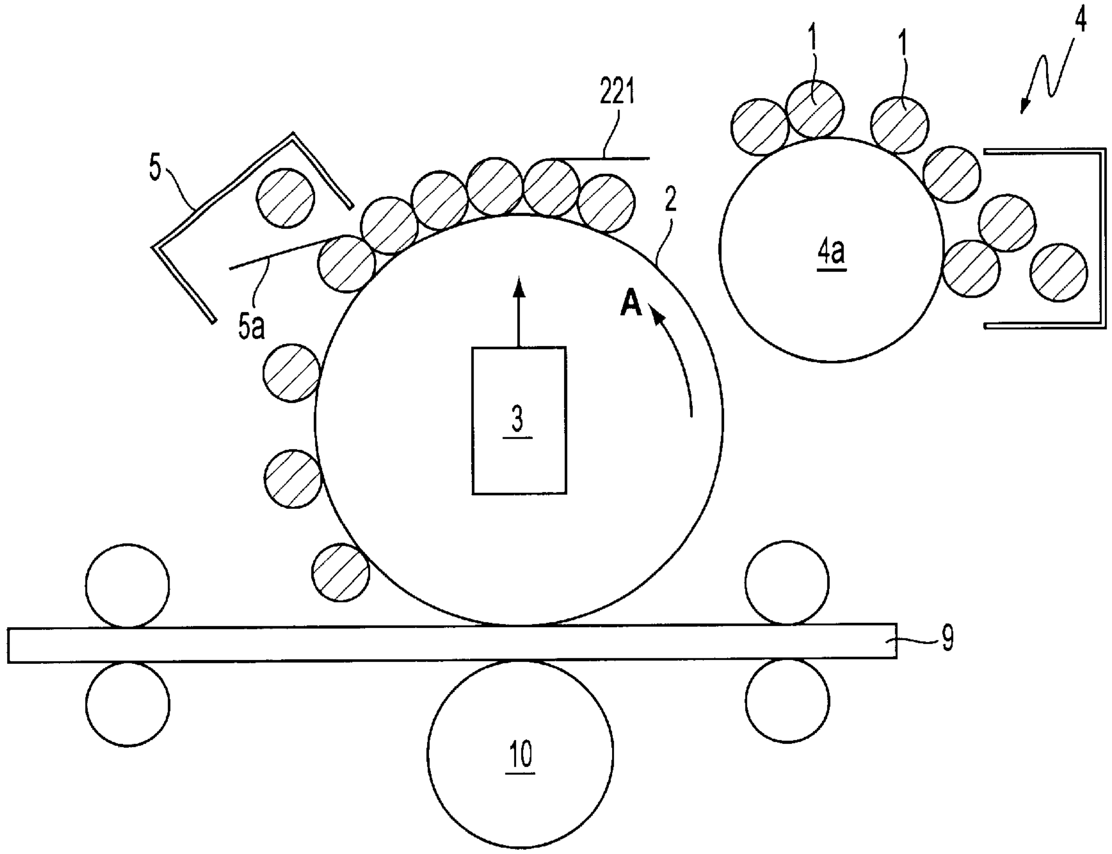
FIG. 24 is a cross sectional view showing the structure of the image forming apparatus according to a seventh embodiment of the present invention.

FIG. 24 is a cross sectional view showing the structure of the image forming apparatus according to a seventh embodiment of the present invention. FIGS. 25A to 25F are explanatory diagrams showing the image formation process in the seventh embodiment in FIG. 24. In this embodiment, the transparent porous structure will be described with reference to these figures.

Figure 25A:
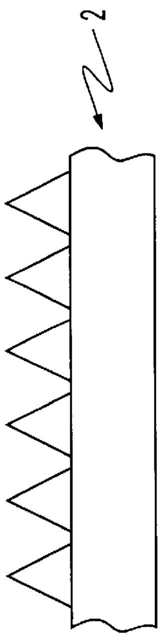
FIGS. 25A to 25F are explanatory diagrams showing the image formation process in the seventh embodiment in FIG. 24.
Figure 25B:
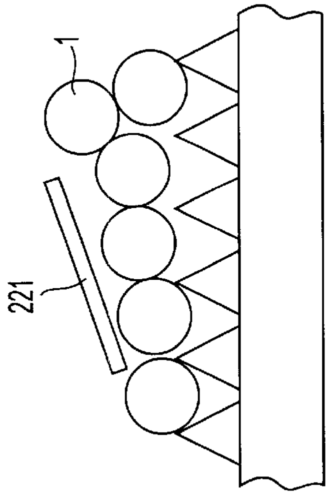
Figure 25C:
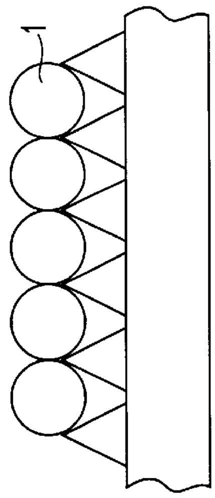

As shown in FIG. 25A, the transparent porous type image holding drum 2 has a pixel-pitch lattice structure for regular arrangement and adhesion to the color material particles 1. The surface of the image holding drum has triangular-shaped roughness, and the pitch between the peak and the valley of the roughness substantially corresponds to the diameter of the color material particle. The color material supply unit 4 attaches the color material particles onto the surface of the image holding drum 2, then the color material particles 1 are supplied only in the cavities of the triangular roughness, one by one (FIG. 25C), by using a pressing blade 221 provided so as to be pressed against the surface of the image holding drum 2 (FIG. 25B). In an ideal state, the color material particles 1 are in point-contact with a slope of the cavity of the triangular roughness. Further, a heat generating layer for photothermal conversion is formed on the surface of the triangular roughness. The heat generating layer is made by, e.g., vacuum evaporation of high-efficiency light-absorbing carbon to glass.

Figure 25D:
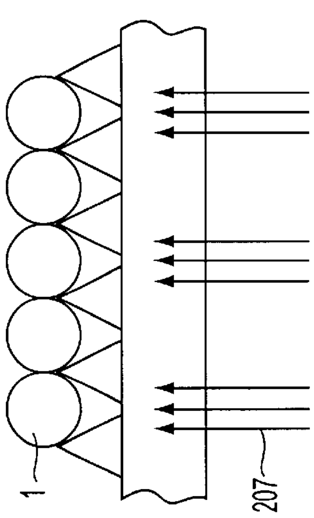
Figure 25E:
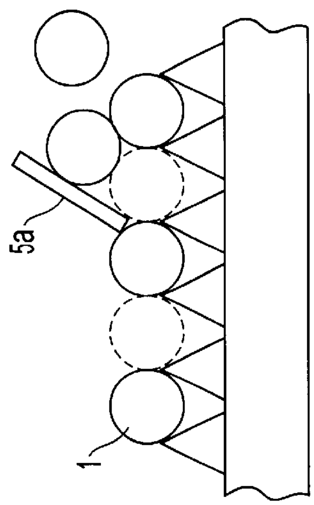
Figure 25F:
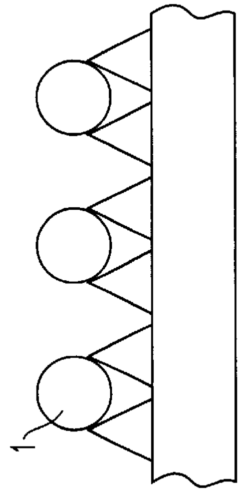

The transparent image holding drum 2 includes the image-signal input unit 3 that performs light irradiation based on an image signal. The image-signal input unit 3 may include an LED unit or a semiconductor laser for, e.g., 300 to 1200 dpi. When the image-signal input unit performs light irradiation based on an image signal sent from the image-signal processing unit (not shown), light stimulus 207 in FIG. 25D passes through the area of the transparent image holding drum 2, then, the heat generating layer generates heat by photothermal conversion on the transparent drum surface at the contact portions between the color material particles 1 and the triangular rough surface, and the color material particles in contact with the heat generating portions melt. As a result, mutual adhesive force increases (FIG. 25D). The removal force by the blade 5*a* of the excessive color material removing unit 5 is less than the increased adhesive force, and equal to or greater than the adhesive force of the point contact at a pixel where the heat generating layer does not generates heat (FIG. 25E). Thus, the image formation on the image holding drum is completed (FIG. 25F).

Figure 26:
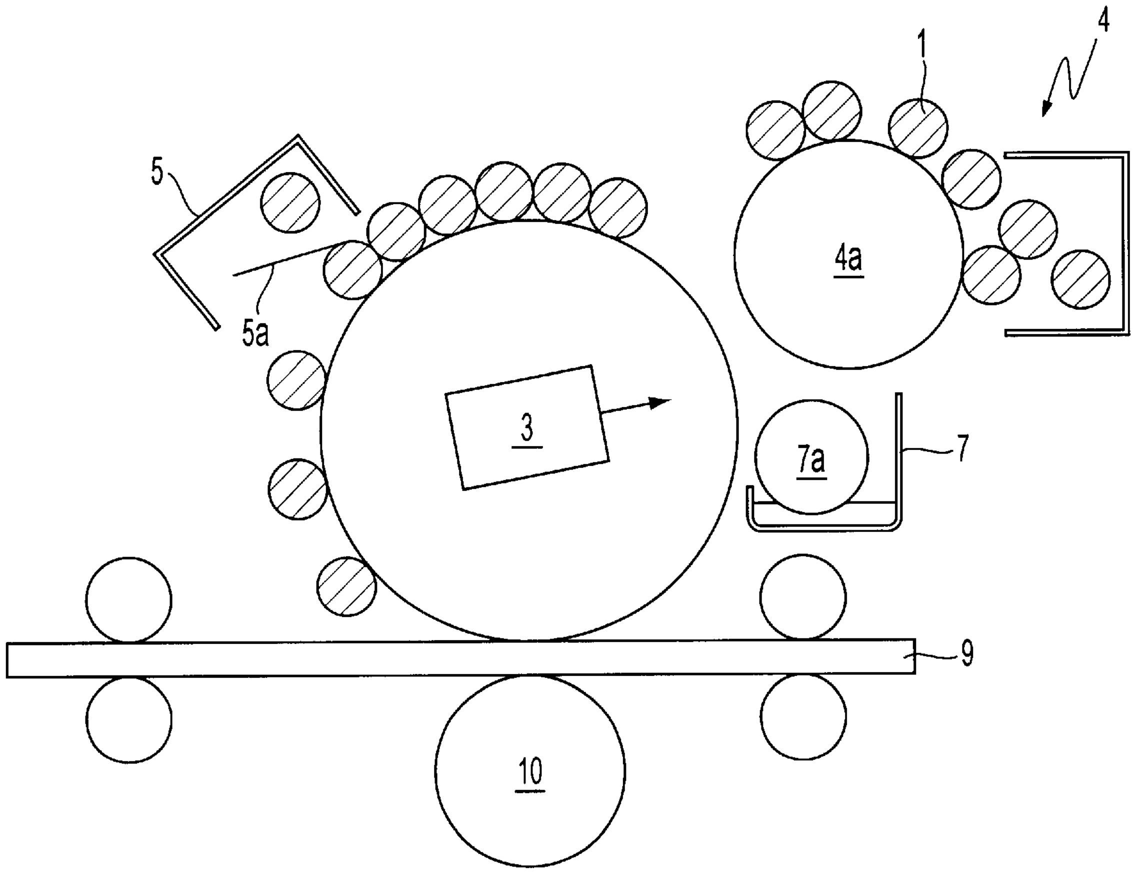
FIG. 26 is a cross sectional view showing the structure of the image forming apparatus according to an eighth embodiment of the present invention.

FIG. 26 is a cross sectional view showing the structure of the image forming apparatus according to an eighth embodiment of the present invention. FIGS. 27A and 27B show an example of the structure of the image holding drum of the eighth embodiment in FIG. 26. FIGS. 27A and 27B are a plan view (A) showing the surface of the image holding drum and a cross sectional view (B) showing the structure of the image holding drum. FIGS. 28A to 28C are explanatory diagrams showing the image formation process in the eighth embodiment in FIG. 26.

Figure 27:
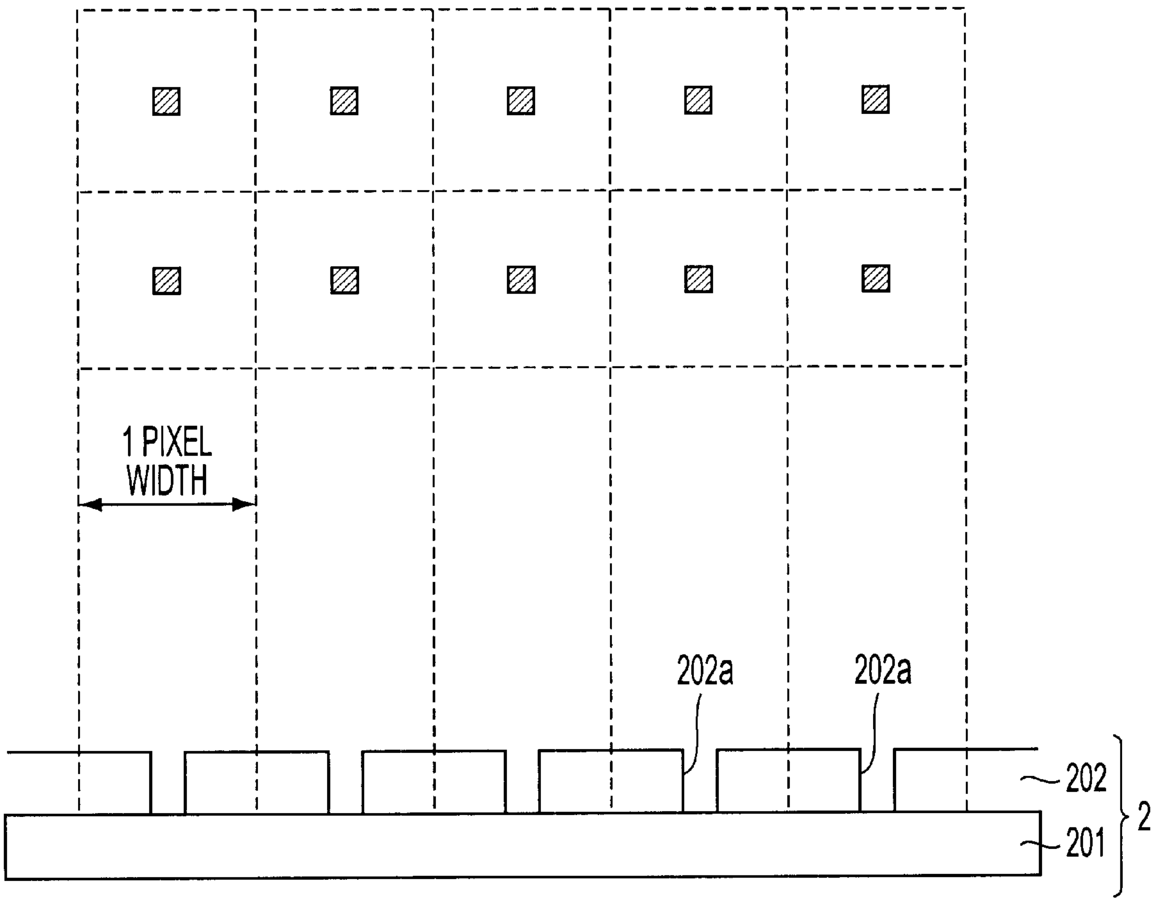
FIG. 27 is a cross sectional view with a projected plan view showing an example of the structure of the image holder.
Figure 28A:
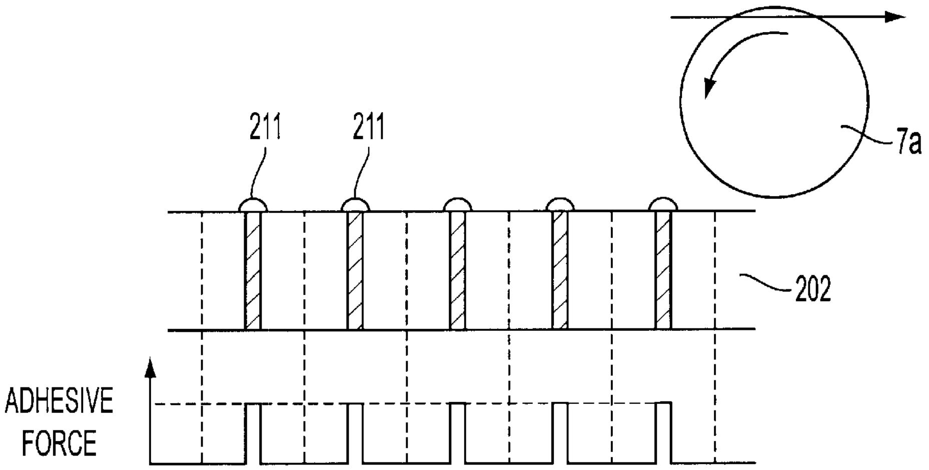
FIGS. 28A to 28C are explanatory diagrams showing the image formation process in the eighth embodiment in FIG. 26.
Figure 28B:
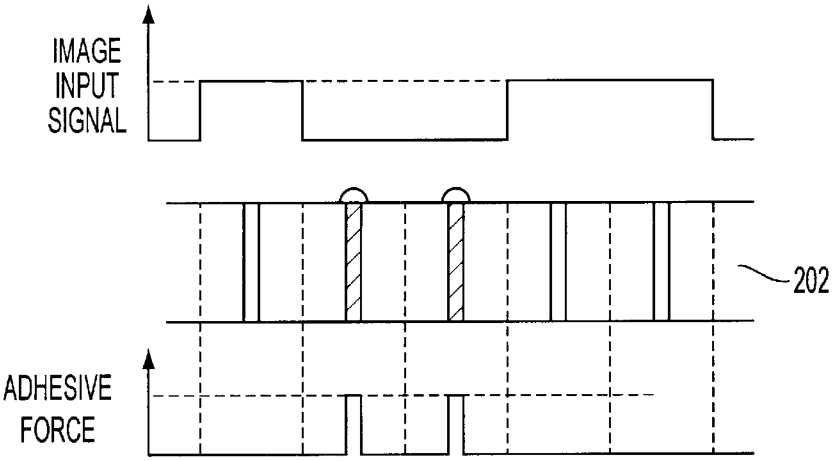
Figure 28C:
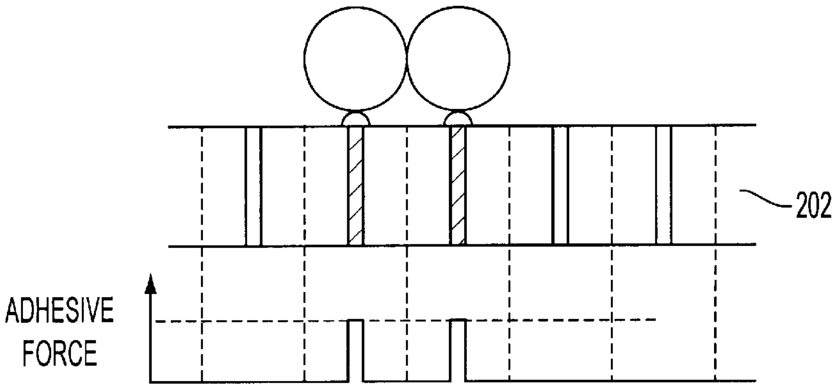

As shown in FIG. 27, the image holding drum 2 of the present embodiment has holes 202*a* in the porous layer 202. The holes 202*a* are not filled with any substance at this stage.

As shown in FIG. 28A, when the rotate-driven liquid supply drum 7*a* is moved on the porous layer of the image holding drum 2, the holes 202*a* are filled with liquid by capillary force of the liquid. If color material is supplied, liquid crosslinking force occurs to change the adhesive force distribution.

Next, the liquid drops in the non-image portion on the image holding drum 2 is irradiated with light based on an image signal. The temperature of the irradiated liquid drops increases by optical-energy absorption and the liquid drops evaporate (FIG. 28B). With the temperature rise and evaporation, the liquid cross-linking force in the non-image portion disappears, and the adhesive force distribution changes. Thereafter, the color material supply unit 4 supplies color material, and processing similar to that in use of hot-melt adhesive is performed. Thus, the image formation is completed (FIG. 28C).

Figure 29:
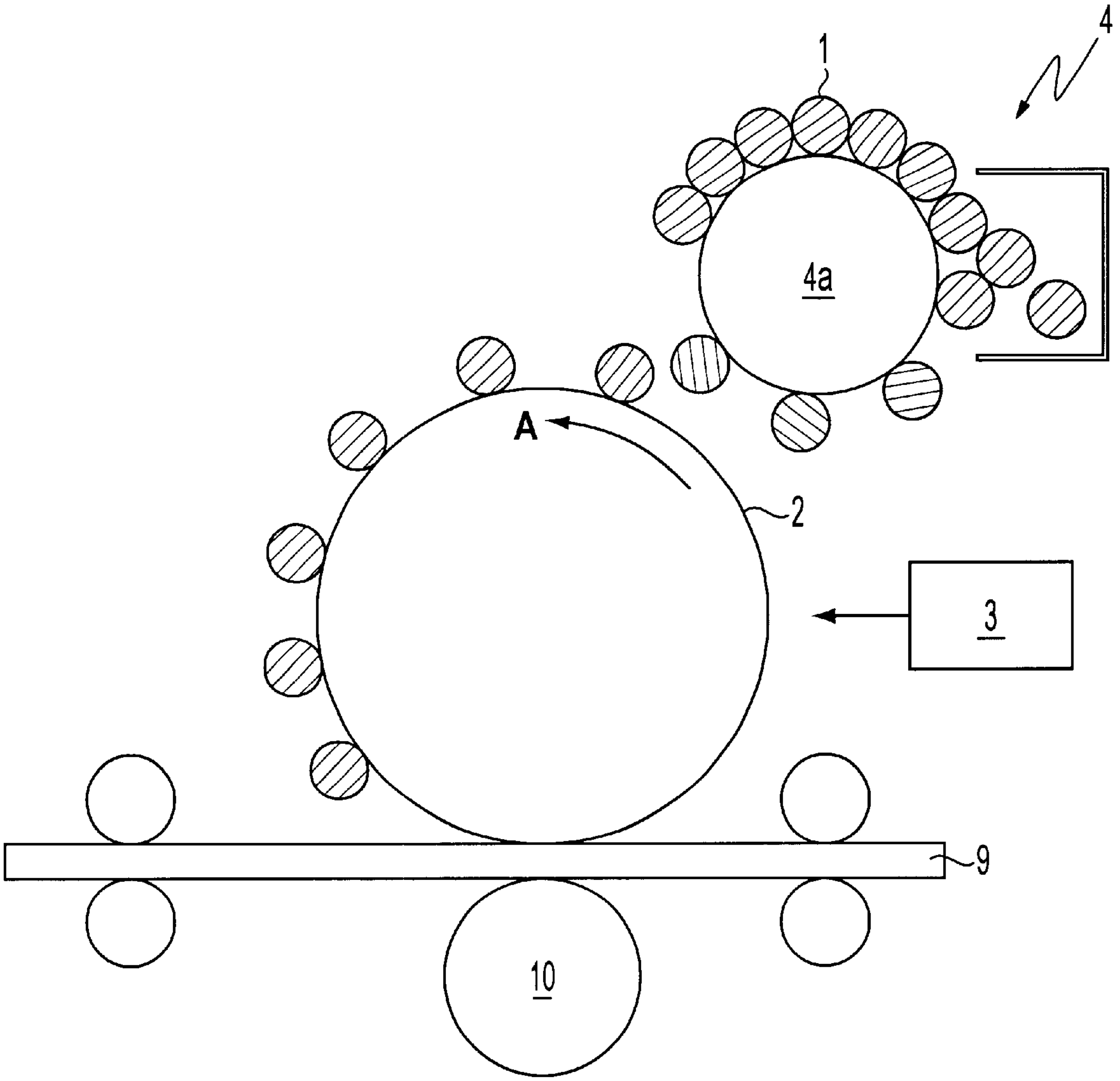
FIG. 29 is a cross sectional view showing the structure of the image forming apparatus according to a ninth embodiment of the present invention.
Figure 30A:
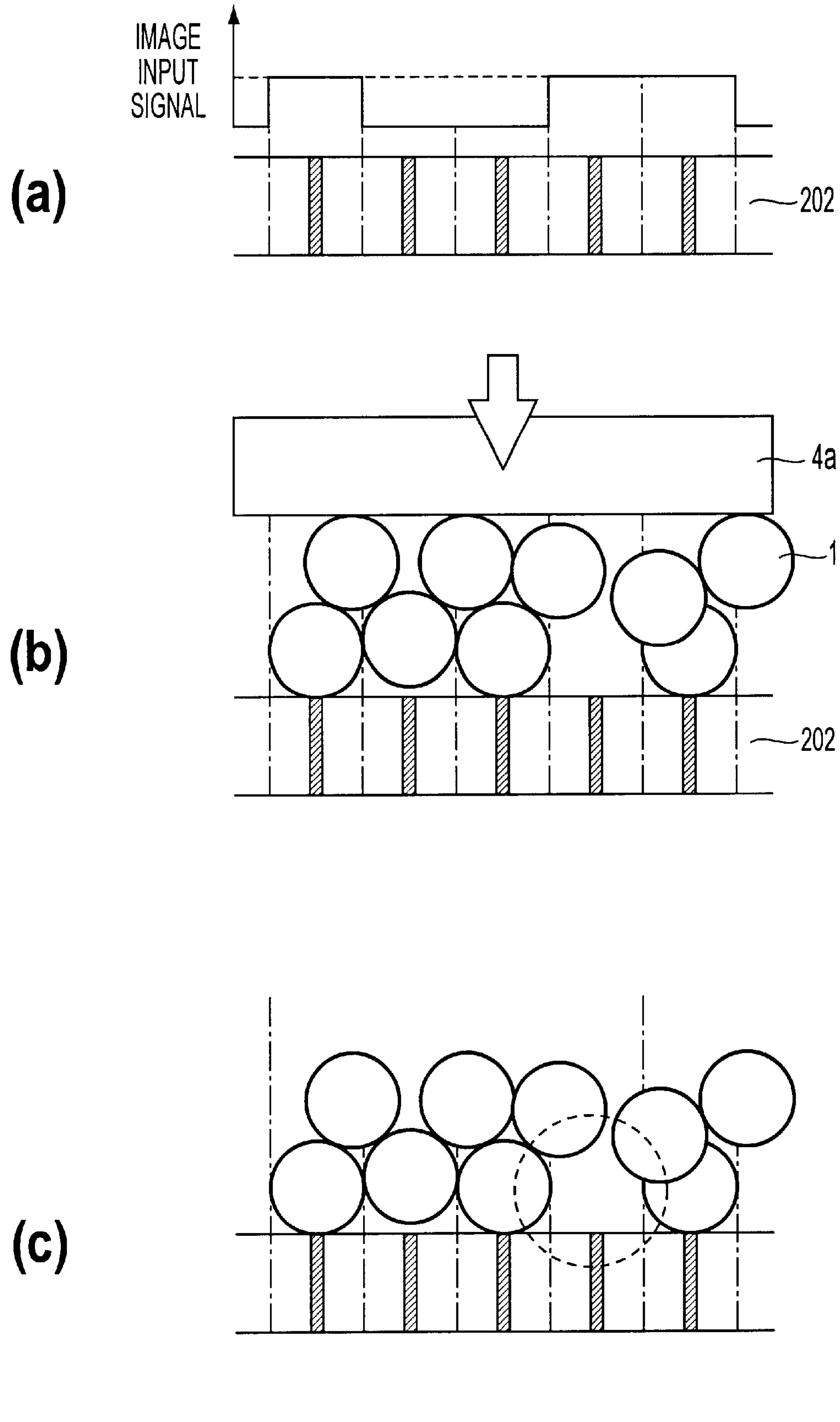
FIGS. 30A and 30B are explanatory diagrams showing the image formation process in the ninth embodiment in FIG. 29 with the structures of the image holding drum and a color material supply roller.
Figure 30B:
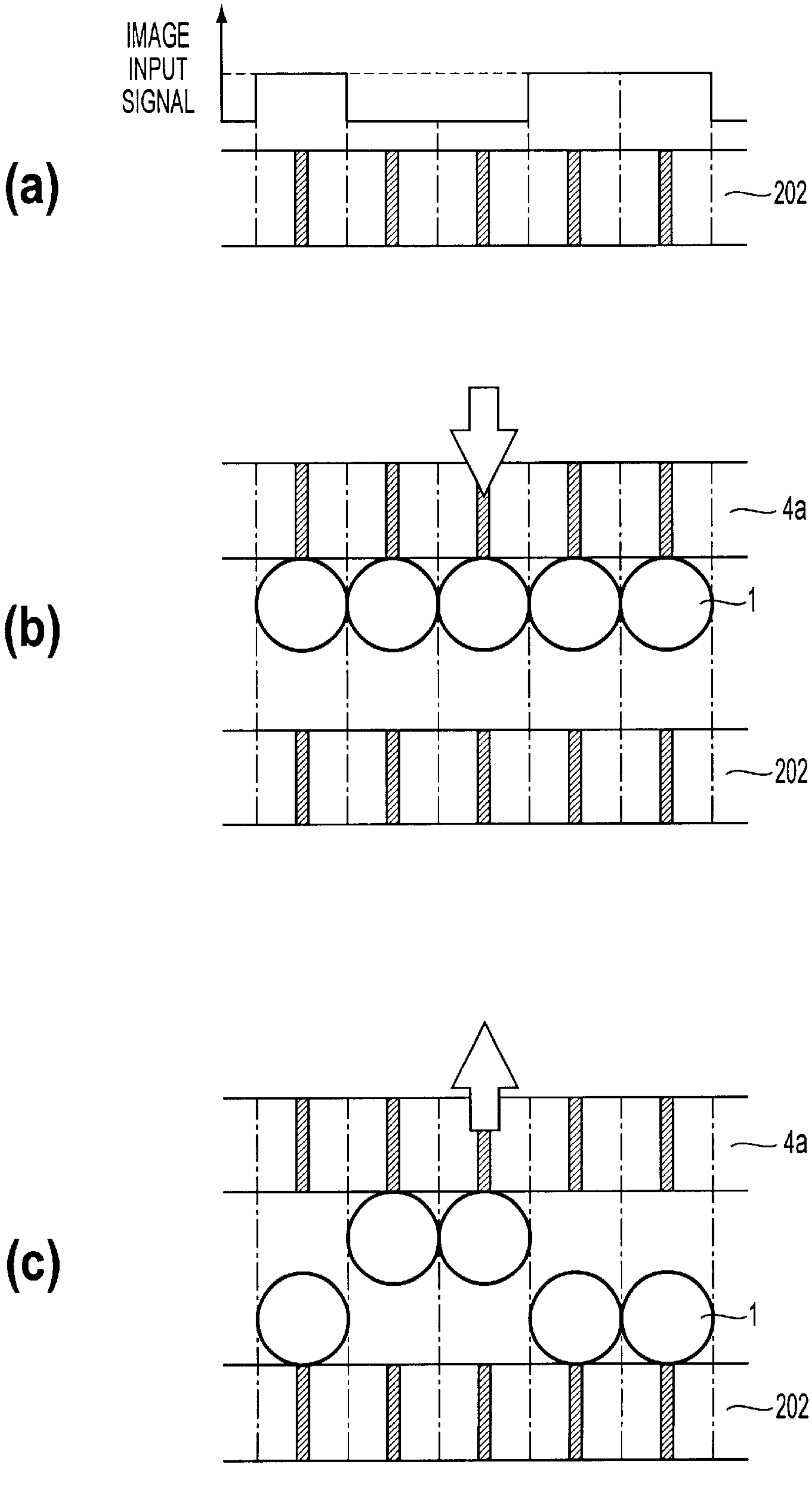

FIG. 29 is a cross sectional view showing the structure of the image forming apparatus according to a ninth embodiment of the present invention. FIGS. 30A and 30B are explanatory diagrams showing the image formation process in the ninth embodiment in FIG. 29 with the structures of the image holding drum 2 and a color material supply roller 4*a*. FIGS. 30A shows a case of supplying a number of color material particles 1 to the image holding drum 2 (porous layer 202) without controlling the positions of the respective color material particles 1 on the color material supply roller 4*a*. FIG. 30B shows a case of arraying the color material particles 1 on the color material supply roller 4*a* and then supplying the color material particles to the image holding drum.

In FIG. 30A, a stimulus corresponding to an image signal is inputted ((a) in FIG. 30A), and the color material supply roller 4*a* supplies the color material particles 1 to the image holding drum 2 ((b) in FIG. 30A). In this case, the color material particle may not be supplied to a necessary portion on the image holding drum ((c) in FIG. 30A).

On the other hand, in FIG. 30B, the color material particles 1 are arrayed on the color material supply roller 4*a* ((a) in FIG. 30B), and in this state, the color material particles 1 are supplied to the image holding drum ((b) in FIG. 30B). In this case, the above inconvenience that the color material particle 1 is not provided to a necessary portion can be prevented.

Further, in this case, as the color material particles 1 are not supplied from the color material supply roller 4*a* to the non-image portion on the image holding drum ((c) in FIG. 30B), the excessive color material removing unit can be omitted.

Thus, an image can be formed with higher precision on the image holding drum by discretely arranging adhesive-force generating portions regularly on the surface of the color material supply unit, similarly to the arrangement on the surface of the image holding drum. In the present embodiment, as an example, the color material supply roller 4*a* has holes regularly and discretely arranged on the surface. The holes are filled with pressure sensitive adhesive having adhesive force lower than that of the hot-melt adhesive used in the image holding drum.

Figure 31:
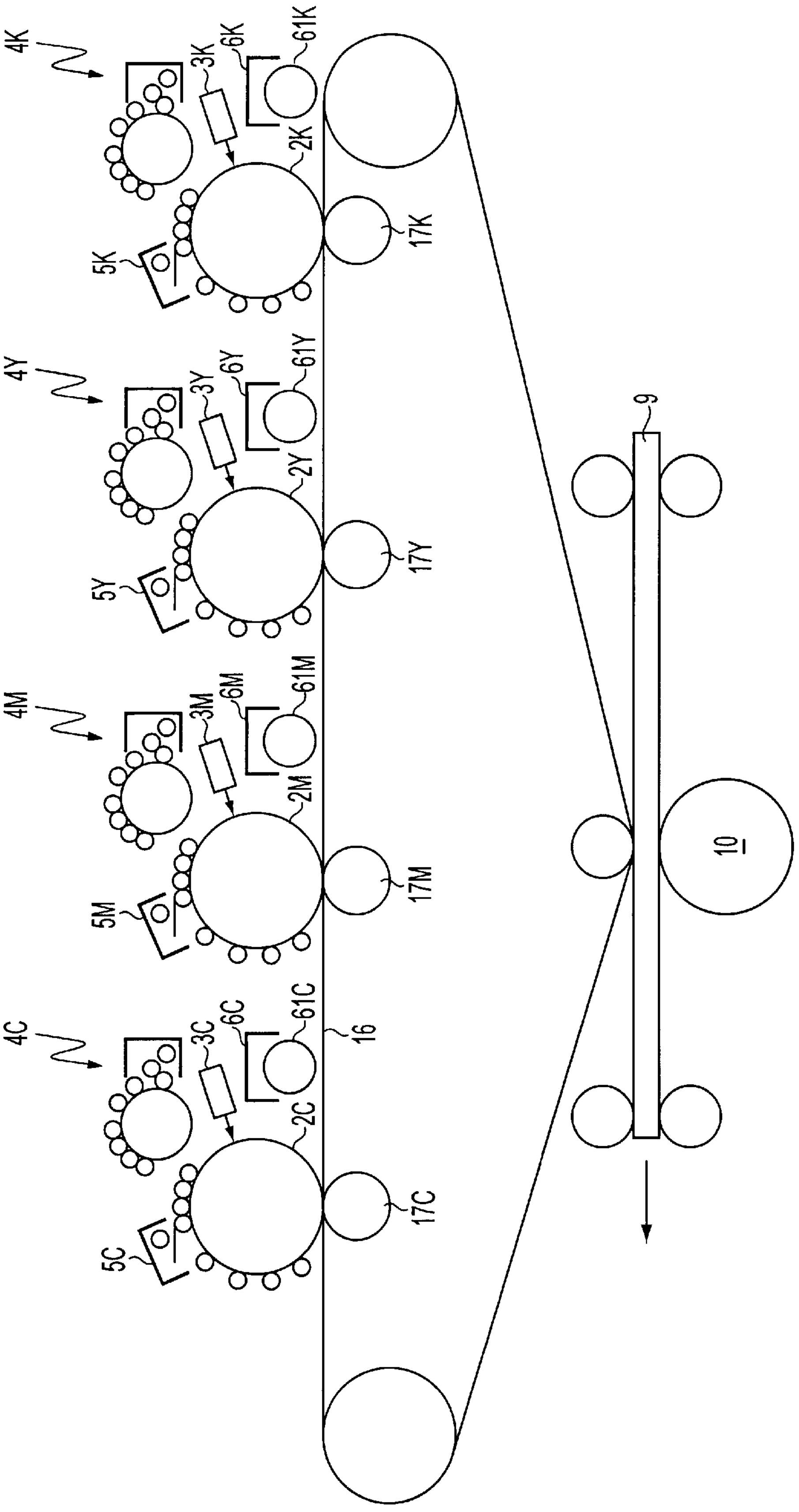
FIG. 31 is a cross sectional view showing the structure of the image forming apparatus according to a tenth embodiment of the present invention.
Figure 32A:
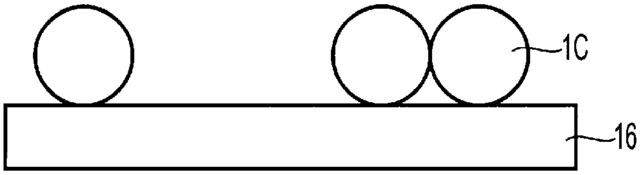
FIGS. 32A to 32D are cross sectional views showing images overlaid on an intermediate transfer belt.
Figure 32B:
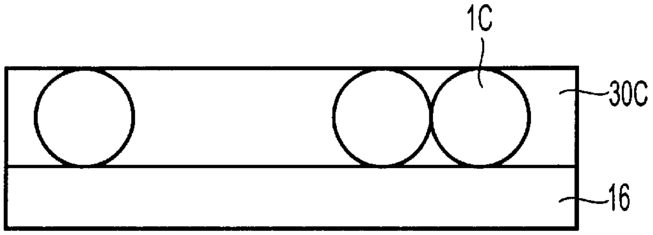
Figure 32C:
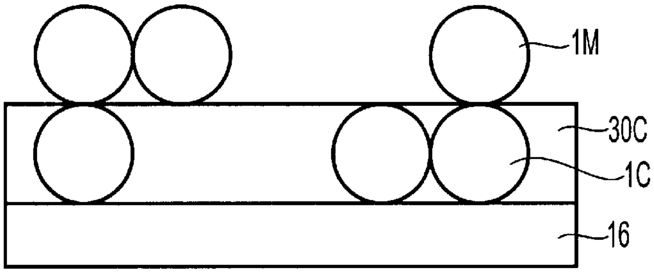
Figure 32D:
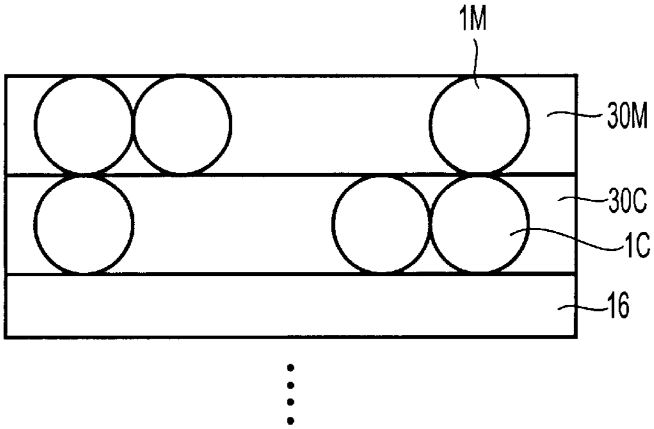

FIG. 31 is a cross sectional view showing the structure of the image forming apparatus according to a tenth embodiment of the present invention. FIG. 31 shows an example of the image forming apparatus for color image formation, where components related to respective colors have reference numerals with alphabets "C", "M", "Y" and "K" indicating corresponding colors.

In FIG. 31, the image holding drums 2 are tandem-provided as cyan 2C, magenta 2M, yellow 2Y and black 2B, around an intermediate transfer belt 16. Further, the color material supply units 4 are provided as cyan 4C, magenta 4M, yellow 4Y and black 4B around the respective image holding drums. The image holding drum has the same structure as that of the first embodiment in FIG. 1 where the holes for the respective pixels are filled with the hot-melt adhesive. As described above, images are formed on the image holding drums of the respective colors, by using the image-signal input units as cyan 3C, magenta 3M, yellow 3Y and black 3B, the color material supply units, 4C, 4M, 4Y and 4B, and the excessive color material removing units as cyan 5C, magenta 5M, yellow 5Y and black 5B.

The intermediate transfer belt 16 is positioned between the image holding drums 2 and the pressing rollers 17 as cyan 17C, magenta 17M, yellow 17Y and black 17B as primary transfer unit. A viscous or adhesive layer is provided on the surface of the intermediate transfer belt 16. The viscous or adhesive layer is formed by using substance which causes adhesive force between the color material particles 1 and the intermediate transfer belt 16 by the pressing of the pressing roller 17 greater than that between the color material particles 1 and the hot-melt adhesive 203 on the image holding drum 2. Further, the color material particles are not discharged as in electrophotographic techniques but adhered to the intermediate transfer belt 16, by pressing the image holding drum 2 against the intermediate transfer belt 16. Accordingly, an image formed on the image holding drum 2 can be transferred onto the intermediate transfer belt 16 while highly-precise image state is maintained without positional shift.

The above operation is performed for the respective colors, and the respective color images are overlaid on the intermediate transfer belt 16. At this time, the fixing unit 6 may perform lamination processing by using pressure sensitive adhesive or adhesive as an example of fixing processing at each transfer of color image onto the intermediate transfer belt 16 so as to prevent positional shift of primarily-transferred image on the intermediate transfer belt accompanying the overlay operation and to facilitate the overlay of the color material particles. The lamination processing is performed by slide-applying a rotate-driven heat roller 61 carrying molten pressure sensitive adhesive or adhesive against the intermediate transfer belt 16.

FIGS. 32A to 32D are cross sectional views showing images overlaid on the intermediate transfer belt 16.

First, an image of cyan color material particles 1C is transferred onto the intermediate transfer belt 16, and the image is lamination processed with pressure sensitive adhesive or adhesive 30C. Next, an image of magenta color material particles 1M is transferred onto the cyan image, and the image is lamination processed with pressure sensitive adhesive or adhesive 30M by the fixing unit 6. Then, an image of yellow color material particles 1Y is transferred onto the magenta image, and the image is lamination processed with pressure sensitive adhesive or adhesive 30Y by the fixing unit 6. Finally, an image of black color material particles 1B is transferred onto the yellow image, and the image is lamination processed with pressure sensitive adhesive or adhesive 30B. In this manner, the transfer and lamination processing are repeated, and the four color images of C, M, Y and K are overlaid on the intermediate transfer belt 16.

When all the color images have been overlaid on the intermediate transfer belt 16, the overlaid images are secondarily transferred simultaneously onto the print sheet 9 as the final medium. The secondary transfer is made by providing the print sheet 9 between the intermediate transfer belt 16 and the pressure heat-transfer roller 10, then at the same time of pressure application, conducting the heat of the pressure heat-transfer roller 10 via the print sheet 9 to the color material particles 1 on the intermediate transfer belt 16. By the secondary transfer, the color material particles 1 and the laminate layer heat melt, and as the viscosity decreases, enter between the gaps among fibers of the print sheet, to be completely fixed. The transfer and fixing are performed in this manner.

Figure 33:
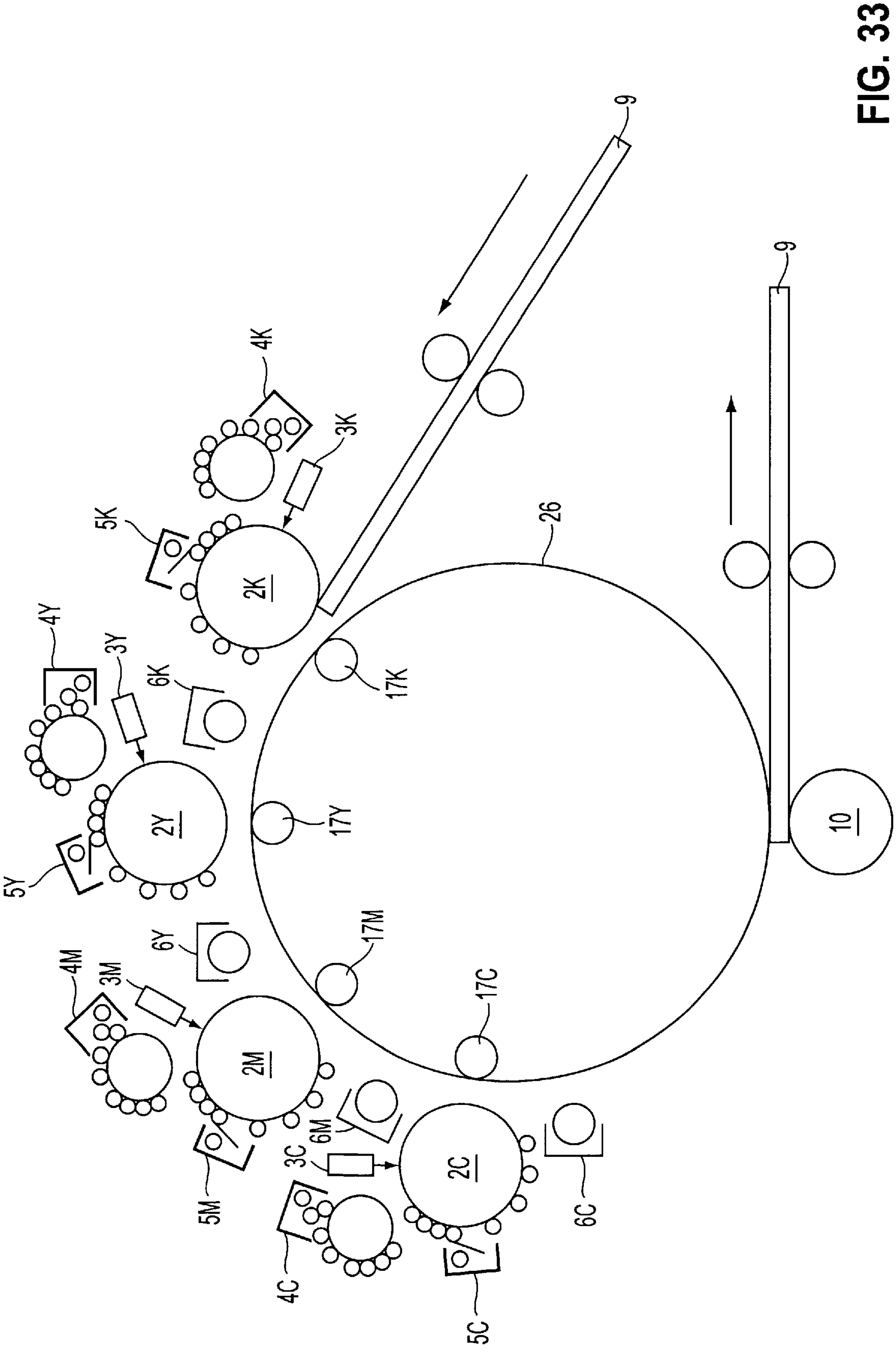
FIG. 33 is a cross sectional view showing the structure of the image forming apparatus according to an eleventh embodiment of the present invention.
Figure 34:
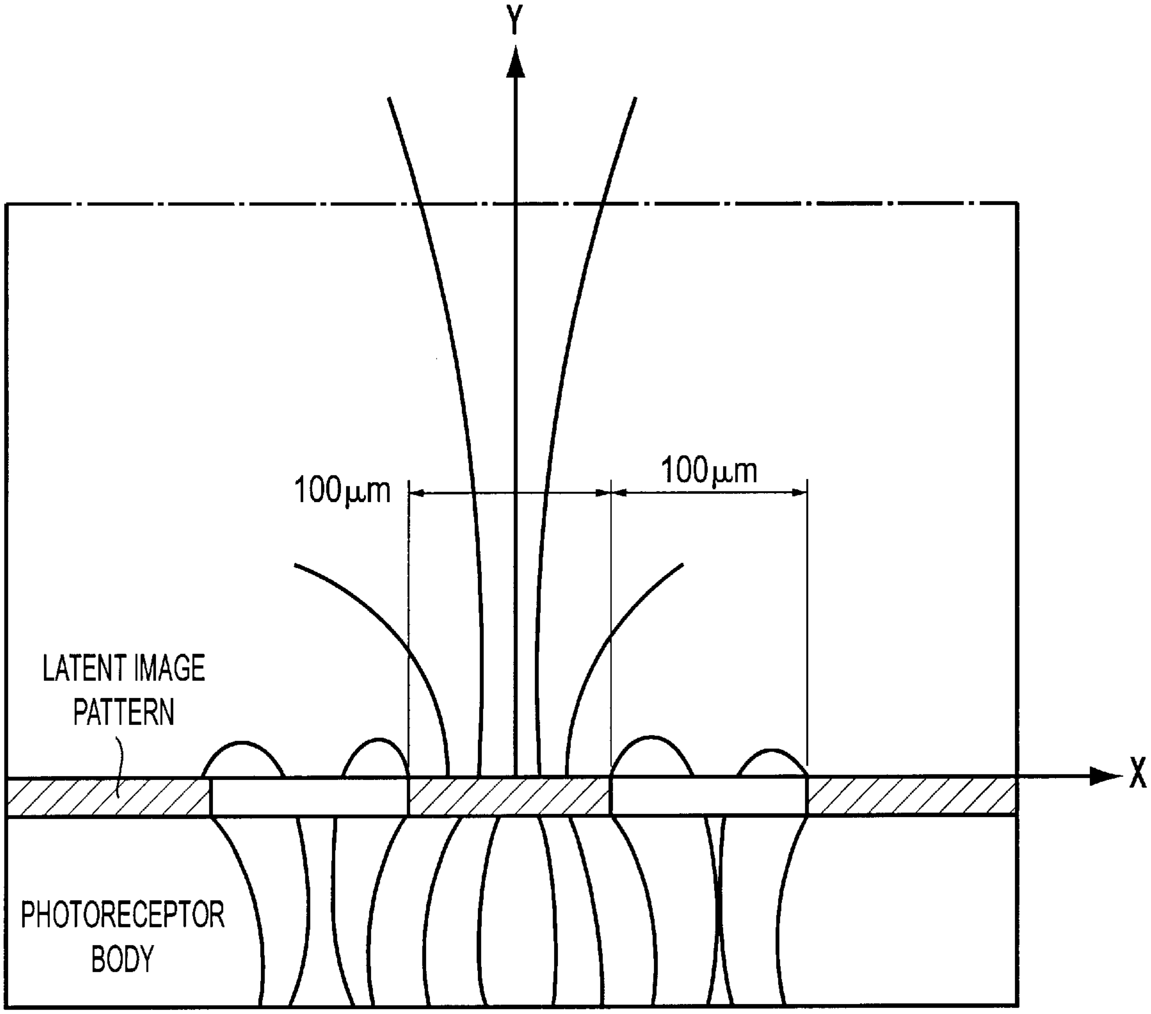
FIG. 34 is an explanatory diagram showing an electric field formed with a ladder pattern latent image on a photoreceptor body.
Figure 35:
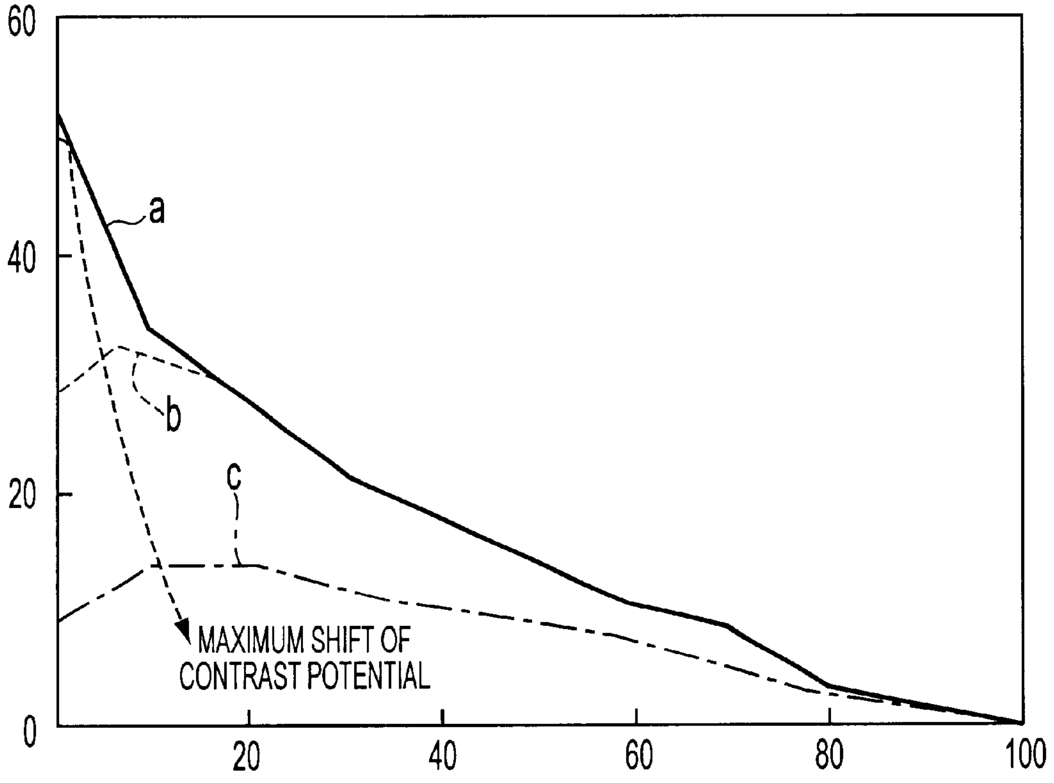
FIG. 35 is a graph showing the change in contrast potential in spatial field.
Figure 36:
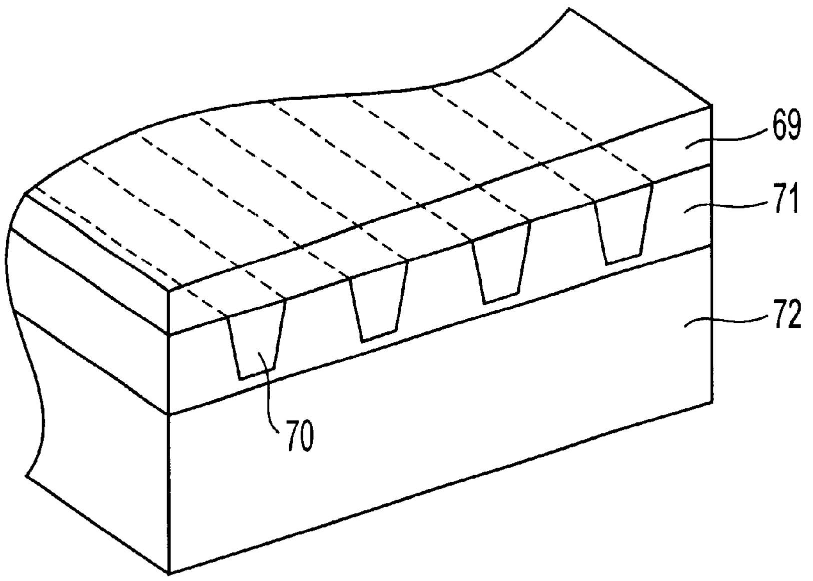
FIG. 36 is a partial perspective view showing the structure of an imaging drum.
Figure 37:
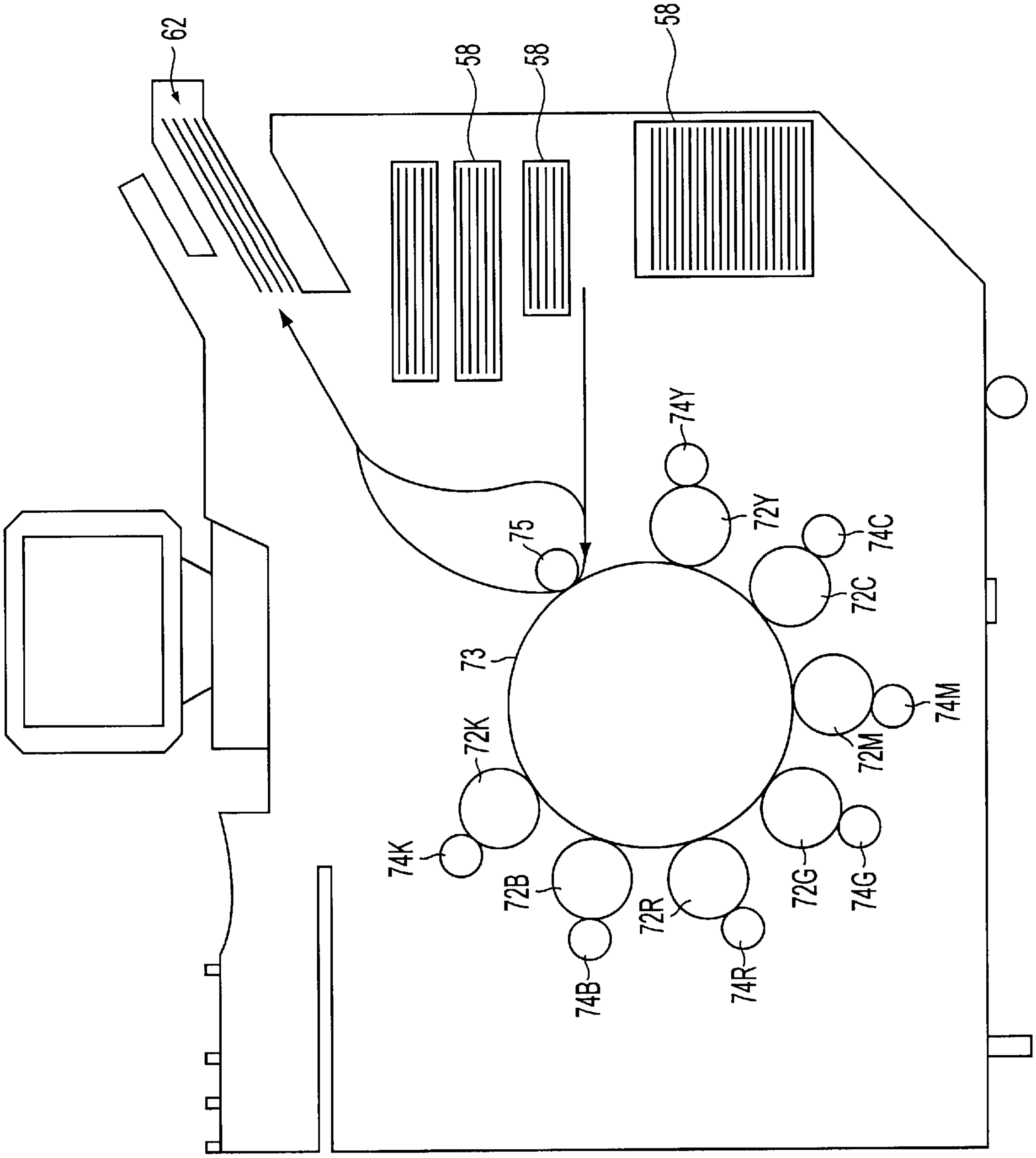
FIG. 37 is a cross sectional view showing the structure of the Oce3125C printer.

FIG. 33 is a cross sectional view showing the structure of the image forming apparatus according to an eleventh embodiment of the present invention.

In this embodiment, a print-sheet holding drum 26, which rotates with holding the print sheet 9 on its surface, is provided in place of the intermediate transfer belt 16 shown in FIG. 31. The images of the respective colors of color material particles are formed on the print sheet 9 held on the surface of the print-sheet holding drum 26. Other components are similar to those in the tenth embodiment in FIG. 31, and therefore the explanations of these components will be omitted.

As described above, the present invention is applicable to an image forming apparatus using an intermediate transfer member or an image forming apparatus which directly transfers an image onto a print sheet without using the intermediate transfer member.

The various embodiments of the image forming apparatus of the present invention have been described, however, the present invention is not limited to any of those embodiments. For example, the image holder is not necessarily a drum but may be a belt. Further, the adhesive force of the adhesive-force changing portion of the image holder may be any of the van der Waals force which is mainly adhesive force, liquid crosslinking force, electrostatic force magnetic force and chemical bonding force, and the stimulus to change the adhesive force may be any of light, heat, an electric field, a magnetic field, pressure, chemical change (e.g., oxidation, polymerization and hydrogen bond) and the like.

Further, similarly, the color material removing unit that removes excessive color material and the transfer unit that transfers an image may utilize any force.

The present invention provides a printing technique which omits pixel position control performed in the conventional electrophotographic units. Especially, the feature of the present invention is that the force to drive the color material functions in single color material units or one-pixel units so as to prevent substantial shift of the color material. Accordingly, the present invention, as a printing technique for high-precision pixel positioning, can be applied to a monochrome and color copying machines, printers and facsimile apparatuses, and enables a printer for large printing amount (CRD). On the other hand, the present invention functions as a color proofer which must attain high image quality. Hereinbelow, the advantages of the present invention will be given.

(1) As color material can be attached to a desired position on the object print medium, highly precise image quality can be obtained.

(2) The movement and rotation precision of the color material supply unit, the image holder and the print-medium rear-surface unit are not necessarily strictly set. As the precision of constituent parts and assembling precision may be at a general level, the present invention is appropriate for mass production. Accordingly, cost reduction can be attained.

The present invention is not limited to the above embodiments and various changes and modifications can be made within the spirit and scope of the present invention. Therefore, to appraise the public of the scope of the present invention, the following claims are made.

What is claimed is:

1. An image forming apparatus, comprising:

an image holder that forms an image of color material on an image holder surface, said image holder surface divided into a number of pixel areas, each pixel area having an adhesive-force change portion that is smaller than the pixel area, wherein each said adhesive-force change portion includes a substance in which an adhesive force applied by the substance to the color material changes in response to a predetermined stimulus, the substance facing the color material and having a viscosity that abruptly decreases while the adhesive force increases by heat melting above a certain temperature;

an image-signal input unit that forms a latent image by distribution of the adhesive force applied by the adhesive-force change portions to the color material on said image holder surface by applying the predetermined stimulus, wherein the predetermined stimulus is applied to said image holder surface corresponding to an image signal; and a color material supply unit that supplies the color material to said image holder surface to develop the Went image into a developed image.

2. The image forming apparatus according to claim 1, wherein said color material supply unit supplies the color material to said image holder when said image-signal input unit has inputted the stimulus corresponding to the image signal into said image holder.

3. The image forming apparatus according to claim 1, wherein said color material supply unit supplies the color material to said image holder surface before said image-signal input unit inputs the stimulus corresponding to the image signal into said image holder.

4. The image forming apparatus according to claim 1, further comprising a color material removing unit that removes excessive color material of the color material supplied to said image holder surface.

5. The image forming apparatus according to claim 1, further comprising a fixing unit that prevents positional shift of the color material constituting the image of the color material formed on said image holder surface.

6. The fixing unit of claim 5, wherein the fixing unit applies an adhesive to the image holder surface after the color material has been affixed to the image holder surface.

7. The image forming apparatus according to claim 1, wherein said image holder has a layer of substance in which adhesive force to color material changes by a stimulus formed in each of said adhesive-force change portion.

8. The image forming apparatus according to claim 1, wherein said image holder has a rear surface with respect to said image holder surface to which color material is supplied, a layer of substance in which adhesive force to color material changes by a stimulus on said image holder surface, and a filter to prevent transmission of the stimulus, received from the rear surface, from said adhesive-force change portion narrower than each of said pixel area to the outside, in each of said pixel area when said image holder surface is divided into a number of pixel areas.

9. The image forming apparatus according to claim 1, wherein said image-signal input unit irradiates said image holder with light modulated based on the image signal.

10. The image forming apparatus according to claim 1, wherein said image-signal input unit has a heat generator to generate heat by energizing, provided in correspondence with each of said adhesive-force change portions, in said image holder, and has an energizing brush to energize each heat generator by rubbing against said image holder, separately from said image holder, and wherein said image-signal input unit energizes said energizing brush in accordance with the image signal while moving said energizing brush relatively to said image holder.

11. The image forming apparatus according to claim 1, wherein said color material supply unit has a color material holder, having color material adhesion areas with high adhesive force to color material provided at a predetermined pitch on its surface, that holds color material in said color material adhesion areas, and conveys said color material to color material supply positions to supply the color material to said image holder.

12. The image forming apparatus according to claim 1, comprising plural sets of said image holder, said image-signal input unit and said color material supply unit, for forming images of different types of color material, wherein said transfer unit transfers a plurality of images of plural types of color material formed on said image holder surface, directly or via a predetermined intermediate transfer medium, onto an image print sheet on which the image is finally printed, in a state where said plurality of images are overlaid.

13. The fixing unit of claim 12, wherein the fixing unit applies an adhesive to each layer of a plurality of layers of the color material of the latent image.

14. The image forming apparatus of claim 1, further comprising a transfer unit that transfers the developed image formed by the color material on said image holder surface directly onto an image print sheet on which the image is finally printed.

15. The image forming apparatus of claim 1, further comprising a transfer unit that transfers the developed image formed by the color material formed on said image holder surface, via a predetermined intermediate transfer medium, to an image print sheet on which the image is finally printed.

16. The image forming apparatus of claim 1, wherein the stimulus activates the substance by heating the substance above the certain temperature.

17. The image forming apparatus of claim 1, wherein the color material attaches to the adhesive-force change portion nearly in a point contact state.

18. An image forming apparatus, comprising;

an image holder that forms an image of color material on an image holder surface, said image holder surface divided into a number of pixel areas, each pixel area defining a pixel width, each pixel area having a adhesive-force change portion having a width of approximately one third the pixel width, wherein each adhesive-force change portion includes a substance in which an adhesive force applied by the substance to the color material changes in response to a predetermined stimulus, the substance having a viscosity that abruptly decreases while the adhesive force increases by heat melting above a certain temperature;

an image signal input unit that forms a latent image by distribution of the adhesive force applied by the adhesive-force change portions to the color material on said image holder surface by applying the predetermined stimulus wherein the predetermined stimulus is applied to said image holder surface corresponding to an image signal; and a color material supply unit that supplies the color material to said image holder surface to develop the latent image into a developed image.

19. The image forming apparatus of claim 18, wherein the stimulus heats the substance above the certain temperature.

20. An image forming apparatus, comprising:

an image holder that forms an image of a dry color material on an image holder surface, said image holder surface divided into a number of pixel areas, each pixel area having an adhesive-force change portion that is approximately one-third the pixel width, wherein each said adhesive-force change portion includes a substance in which an adhesive force applied by the substance to the dry color material changes in response to a predetermined stimulus, the substance facing the dry color material;

an image-signal input unit that forms a latent image by distribution of the adhesive force applied by the adhesive-force change portions to the dry color material on said image holder surface by applying the predetermined stimulus, wherein the predetermined stimulus is applied to said image holder surface corresponding to an image signal; and a dry color material supply unit that supplies the dry color material to said image holder surface to develop the latent image into a developed image.

* * * * *